United States Patent
Chen et al.

(10) Patent No.: US 12,418,829 B2
(45) Date of Patent: Sep. 16, 2025

(54) SERVICE DATA PROCESSING, EXCHANGE AND EXTRACTION METHODS, DEVICES, AND COMPUTER-READABLE MEDIUM

(71) Applicant: ZTE Corporation, Guangdong (CN)

(72) Inventors: Jie Chen, Guangdong (CN); Feng Liu, Guangdong (CN); Aihua Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 452 days.

(21) Appl. No.: 17/922,296

(22) PCT Filed: Apr. 29, 2021

(86) PCT No.: PCT/CN2021/090977
§ 371 (c)(1),
(2) Date: Oct. 28, 2022

(87) PCT Pub. No.: WO2021/219079
PCT Pub. Date: Nov. 4, 2021

(65) Prior Publication Data
US 2023/0164624 A1    May 25, 2023

(30) Foreign Application Priority Data
Apr. 30, 2020  (CN) .......................... 202010367821.4

(51) Int. Cl.
*H04W 28/06* (2009.01)
*H04L 47/41* (2022.01)
(52) U.S. Cl.
CPC ............. *H04W 28/06* (2013.01); *H04L 47/41* (2013.01)

(58) Field of Classification Search
CPC ..... H04W 28/00; H04W 28/02; H04W 28/06; H04W 28/065; H04W 28/0263;
(Continued)

(56) References Cited

U.S. PATENT DOCUMENTS

| | | |
|---|---|---|
| 2003/0048813 A1 | 3/2003 | Lahav et al. |
| 2007/0104485 A1 | 5/2007 | Zhang |

(Continued)

FOREIGN PATENT DOCUMENTS

| | | | |
|---|---|---|---|
| CA | 2811040 A1 | * 12/2005 | ............. B25B 27/10 |
| CN | 1791057 A | 6/2006 | |

(Continued)

OTHER PUBLICATIONS

International Search Report and Written Opinion for International Application No. PCT/CN2021/090977, mailed on Jun. 25, 2021. 8 pages with translation.

(Continued)

*Primary Examiner* — Warner Wong
(74) *Attorney, Agent, or Firm* — Perkins Coie LLP

(57) ABSTRACT

Provided is a service data processing method. The service data processing method includes: generating, based on service data of a plurality of client services, service blocks of the client services, respectively; mapping the service blocks of the client services into a payload area of at least one sub slicing frame (SSF); and configuring an overhead area field of each SSF to obtain the at least one SSF, wherein each of the SSF carries the service blocks of a plurality of different client services. Further provided are a service data exchange method, a service data extraction method, a provider edge device, a provider exchange device, and a computer-readable medium.

21 Claims, 18 Drawing Sheets

(58) Field of Classification Search
CPC ...... H04W 4/00; H04L 47/2408; H04L 47/41; H04L 49/20; H04L 65/00; H04L 41/50
See application file for complete search history.

(56) References Cited

U.S. PATENT DOCUMENTS

| | | | |
|---|---|---|---|
| 2010/0021173 A1 | 1/2010 | Zhang et al. | |
| 2018/0375604 A1 | 12/2018 | Su et al. | |
| 2020/0014480 A1 | 1/2020 | Xiang et al. | |
| 2022/0149973 A1* | 5/2022 | Zhu | H04J 14/0264 |

FOREIGN PATENT DOCUMENTS

| | | | | |
|---|---|---|---|---|
| CN | 101051879 A | 10/2007 | | |
| CN | 109478941 A | 3/2019 | | |
| EP | 4106284 A1 * | 12/2022 | | H04J 3/1658 |
| JP | 2010200235 A | 9/2010 | | |
| JP | 2019507562 A | 3/2019 | | |
| JP | 2019519999 A | 7/2019 | | |
| WO | 2019062227 A1 | 4/2019 | | |
| WO | WO-2021259286 A1 * | 12/2021 | | H04L 41/0896 |

OTHER PUBLICATIONS

European Search Report issued in EP Patent Application No. 21795880.0, dated Mar. 27, 2024. 9 pages.
Japanese office action issued in JP Patent Application No. 2022-566074, dated Jul. 1, 2025, 10 pages. English translation included.

* cited by examiner

US 12,418,829 B2

SERVICE DATA PROCESSING, EXCHANGE AND EXTRACTION METHODS, DEVICES, AND COMPUTER-READABLE MEDIUM

CROSS-REFERENCE TO RELATED APPLICATION

This application is a U.S. National Stage Application filed under 35 U.S.C. 371 based on International Patent Application No. PCT/CN2021/090977, filed Apr. 29, 2021, which claims priority to CN patent application No. 202010367821.4, filed with China Patent Office on Apr. 30, 2020, the disclosures of which are incorporated herein in their entireties by reference.

FIELD

Embodiments of the present disclosure relate to, but are not limited to, the technical field of communications.

BACKGROUND

A flexible Ethernet (FlexE) technologies were relevant technical standards initiated by the international organization for standardization OIF (Optical Internetworking Forum) in March 2015 and formally voted through in March 2016. The flexible Ethernet technology provides a universal mechanism to transmit a series of services with different media access control (MAC) rates. The services may be either a single service with a relatively large MAC rate, or a set of a plurality of services with relatively small MAC rates, and are no longer limited to services with a single MAC rate.

SUMMARY

Embodiments of the present disclosure provide a service data processing method, a service data exchange method, a service data extraction method, a provider edge device, a provider exchange device, and a computer-readable medium.

According to a first aspect, an embodiment of the present disclosure provides a service data processing method, including: generating, based on service data of a plurality of client services, service blocks of the client services; mapping the service blocks of the client services into a payload area of at least one sub slicing frame (SSF); and configuring an overhead area field of each SSF to obtain the at least one SSF, wherein each of the SSF carries the service blocks of a plurality of different client services.

According to a second aspect, an embodiment of the present disclosure provides a service data exchange method, including: determining outgoing ports of service blocks in incoming SSFs received via incoming ports, wherein each of the incoming SSFs carries the service blocks of a plurality of different client services; mapping the service blocks corresponding to the same outgoing port into at least one outgoing SSF, wherein each of the outgoing SSFs carries the service blocks of a plurality of different client services; and transmitting the outgoing SSFs through the outgoing ports.

According to a third aspect, an embodiment of the present disclosure provides a service data extraction method, including: extracting a service block of a predetermined client service from at least one SSF, wherein each of the SSF carries service blocks of a plurality of different services; and decoding the service block of the predetermined client service to extract service data of the predetermined client service.

According to a fourth aspect, an embodiment of the present disclosure provides a provider edge (PE) device, including: one or more processors; a storage apparatus, stored one or more programs thereon, wherein when the one or more programs are executed by the one or more processors, the one or more processors implement any one of the foregoing service data processing methods, or any one of the foregoing service data extraction methods; and one or more I/O interfaces, connected between the processor and the storage apparatus, and configured to implement information interaction between the processor and the storage apparatus.

According to a fifth aspect, an embodiment of the present disclosure provides a provider exchange device, including: one or more processors; a storage apparatus, stored one or more programs thereon, wherein when the one or more programs are executed by the one or more processors, the one or more processors implement any one of the foregoing service data exchange methods; and one or more I/O interfaces, connected between the processor and the storage apparatus, and configured to implement information interaction between the processor and the storage apparatus.

According to a sixth aspect, an embodiment of the present disclosure provides a computer-readable medium, stored a computer program thereon, wherein when executed by a processor, the program implements any one of the foregoing service data processing methods, or any one of the foregoing service data exchange methods, or any one of the foregoing service data extraction methods.

BRIEF DESCRIPTION OF THE DRAWINGS

The accompanying drawings constituting a part of the specification are used to provide a further understanding of the embodiments of the present disclosure, and explain the present disclosure together with the embodiments of the present disclosure, but do not constitute a limitation to the present disclosure. The above and other features and advantages will become more apparent to those skilled in the art by describing detailed example embodiments with reference to the accompanying drawings, wherein.

DETAILED DESCRIPTION OF EMBODIMENTS

Figure 1:
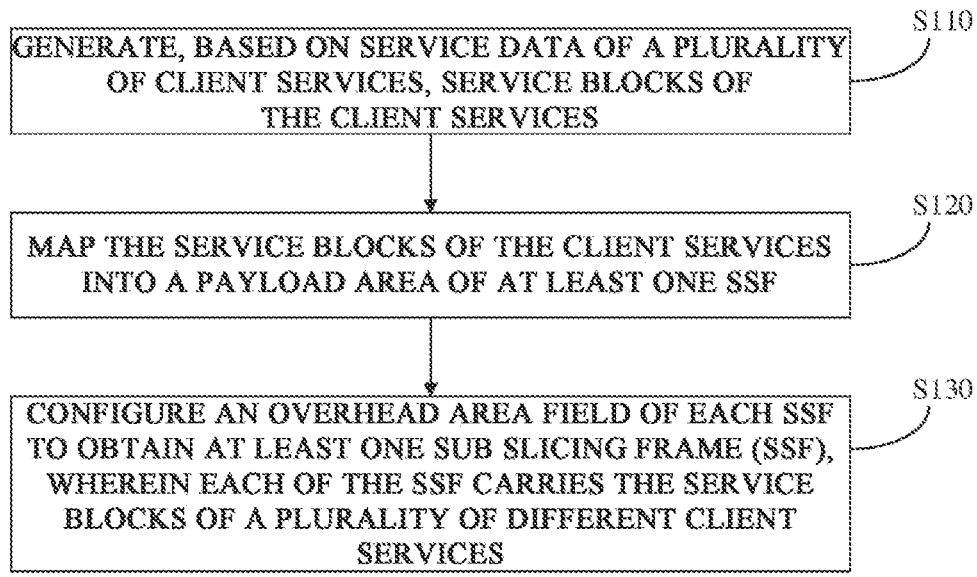
FIG. 1 is a flow diagram of a service data processing method provided in an embodiment of the present disclosure.

To enable those skilled in the art to better understand the technical solutions of the present disclosure, a service data processing method, a service data exchange method, a service data extraction method, a provider edge device, a provider exchange device, and a computer-readable medium provided by the present disclosure will be described in detail below with reference to the accompanying drawings.

Example embodiments will be described more fully hereinafter with reference to the accompanying drawings. However, the example embodiments may be embodied in different forms and should not be construed as being limited to the embodiments set forth herein. Rather, these embodiments are provided, so that the present disclosure will be thorough and complete, and those skilled in the art may fully understand the scope of the present disclosure.

In the case of no conflict, the embodiments of the present disclosure and the features in the embodiments may be combined with each other.

As used herein, the terms "and/or" include any and all combinations of one or more of relevant listed items.

The terms used herein are for the purpose of describing particular embodiments only and are not intended to limit the present disclosure. As used herein, singular forms "a", "an" and "the" are intended to include plural forms as well, unless the context clearly indicates otherwise. It should also be understood that, when the terms "include", "comprise" and/or "made of" are used in the present specification, they indicate the presence of features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meanings as commonly understood by those ordinary skilled in the art. It will also be understood that, those terms, such as those defined in commonly used dictionaries, should be interpreted as having meanings consistent with those in relevant arts and the background of the present disclosure, and will not be interpreted as having idealized or overly formal meanings, unless expressly so defined herein.

A slicing packet network (SPN) and a metro transport network (MTN) utilize a FlexE as a service layer, so as to implement an end-to-end service rigid channel. However, at present, the minimum client service granularity supported by the FlexE, SPN and MTN standards is 5 Gb/s, and hard isolation and rigid channel services less than 5 Gb/s are not supported. In addition, the minimum service granularity supported by an optical transport network (OTN) technology is 1.25 Gb/s, but services less than 1.25 Gb/s are not supported. The inventor of the present disclosure finds that, methods for supporting small-granularity client services in the prior art are all improved on the basis of original 5G-granularity slots of the FlexE, which mainly has the following problems: (1) there is still a limitation to the service granularity, for example, it is required that the service granularity is not less than 1 Gb/s, and small-granularity services, such as 10 Mb/s or 100 Mb/s, are not supported; (2) the flexibility is relatively low, although the transmitted services are no longer limited to services of a single MAC rate, it is very difficult to support the hybrid transmission of small-granularity client services with different granularities in one 5G slot; and (3) there is no compatibility, the existing Ethernet, FlexE, SPN and MTN standards cannot be compatible, and communication with the existing devices cannot be realized, for example, a P (Provider) node of a standard SPN device cannot be penetrated through.

In view of this, in a first aspect, referring to FIG. 1, an embodiment of the present disclosure provides a service data processing method, including: S110, generating, based on service data of a plurality of client services, service blocks of the client services; S120, mapping the service blocks of the client services into a payload area of at least one sub slicing frame (SSF); and S130, configuring an overhead area field of each SSF to obtain the at least one SSF, wherein each of the SSF carries the service blocks of a plurality of different client services.

In the embodiment of the present disclosure, a sub slicing frame (SSF) is provided, wherein the SSF includes an overhead area and a payload area, and the payload area of the SSF may carry at least one client service. Each client service corresponds to one sub slicing channel (SSC), and the SSCs of all client services constitute a sub slicing channel layer (SSCL).

It should be noted that, in the embodiment of the present disclosure, the SSC is a logical channel, which is established on a service layer channel, and the SSCL is a logical channel sublayer, which is established on a service layer, for example, SSCL is a channel sublayer, which is located between a physical coding sublayer (PCS) of IEEE 802.3 and a medium access control (MAC). In the embodiment of the present disclosure, the service layer is not specifically limited, for example, as shown in FIG. 2, the service layer may be a slicing channel layer (SCL) of an SPN, which corresponds an SPN slicing channel; or may be a Path layer of an MTN, which corresponds to an MTN Path channel; or may be a FlexE; and may also be an Ethernet port physical layer (PHY), that is, the IEEE 802.3 PHY in FIG. 2; and in addition, the service layer may also be an optical transport network (OTN).

In the embodiment of the present disclosure, a frame structure is predefined for the SSF, and the predefined frame structure is not specifically defined in the present disclosure. In a source provider edge (PE) node, by means of S110, service data of different client services is packaged and coded according to a predetermined format, so as to generate service blocs, which conform to the predefined frame structure of the SSF. It can be understood that, the service blocks of different client services, which conform to the predefined frame structure of the SSF, have the same format and size. In S120, by means of a predetermined mapping manner, the service blocks of the client services are assembled, and in S130, the overhead area field of each SSF is configured to generate at least one SSF, which conforms to the predefined frame structure. It should be noted that, in the embodiment of the present disclosure, the execution sequence of S130 with respect to S110 and S120 is not limited, for example, the overhead area field of the SSF may be configured before the service blocks of the client services are mapped into the at least one SSF; and the overhead area field of the SSF may also be configured after the service blocks of the client services are mapped into the at least one SSF.

Figure 2:
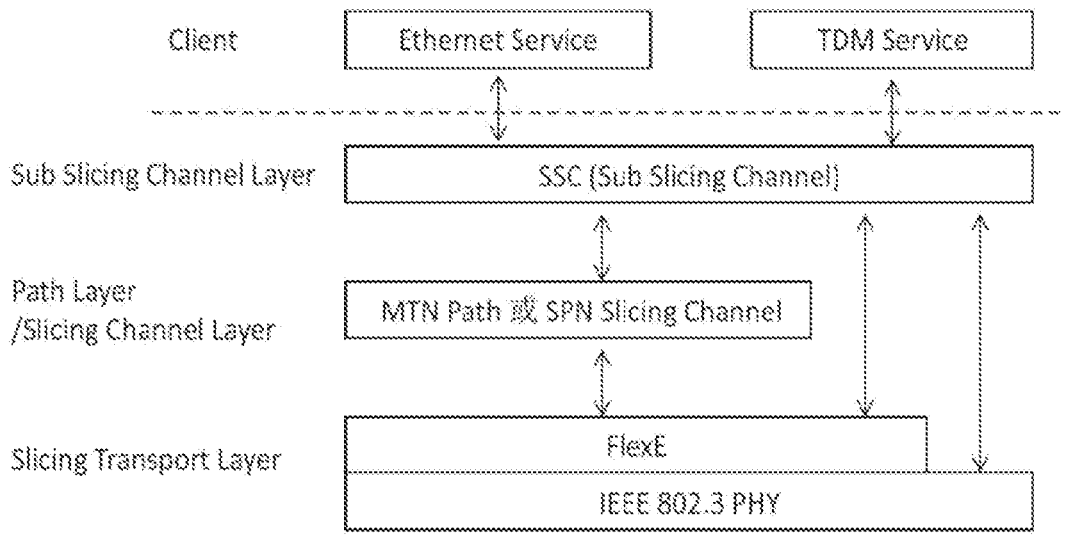
FIG. 2 is a schematic diagram of service carrying levels in an embodiment of the present disclosure.

In the embodiment of the present disclosure, the type of the client service is not specifically limited, for example, as shown in FIG. 2, the client service may be an Ethernet service, and may also be a time division multiplexing (TDM) service with a fixed rate. Further, in S110, the plurality of client services may be N Ethernet services, or may be N TDM services, or may be M Ethernet services and L TDM services, wherein M+L=N, N is a positive integer, and L and M are natural numbers. This is not specifically limited in the embodiment of the present disclosure.

In the embodiment of the present disclosure, the granularity of the client service is not specifically limited either. The client service may be a service less than 5G granularity, for example, the granularity of the client service is 1 Gb/s, 100 Mb/s, 10 Mb/s or the like; the client service may also be a 5G-granularity service, that is, the granularity of the client service is 5 Gb/s; and the client service may also be a service greater than 5G granularity, for example, the granularity of the client service is 6 Gb/s, 8 Gb/s, or the like.

It should be noted that, in the embodiment of the present disclosure, each SSF carries a plurality of different client services, that is, each SSF is composed of service blocks of a plurality of different client services. In the embodiment of the present disclosure, when there are a plurality of client services, the service blocks of the plurality of client services may be assembled into the same SSF, and two or more adjacent SSFs may also form a sub slicing multi-frame (SSMF), and the plurality of client services are mapped into the SSMF. This is not specifically limited in the embodiment of the present disclosure. For example, according to a predefined frame length of the SSF, and the number and granularity of the client services, it is determined that the plurality of client services are mapped into one SSF, or are mapped into an SSMF, which is composed of a plurality of SSFs.

In the embodiment of the present disclosure, the granularities of the plurality of client services may be different. In S120, the numbers of service blocks of the client services with different granularities, which are mapped into the SSF or the SSMF, are different, thereby implementing SSCs with different bandwidths, which are capable of carrying the client services with different granularities. It can be understood that, by means of S110 to S130, an SSC of any bandwidth can be implemented, that is, the granularity of the client service is no longer limited in the embodiment of the present disclosure.

It should also be noted that, the SSF generated by the source PE node further includes other data constituting the SSF, for example, operation administration and maintenance (OAM) information, which is not specifically limited in the embodiment of the present disclosure.

According to the service data processing method provided in the embodiment of the present disclosure, an SSF is provided, wherein each SSF may carry a plurality of different client services, and a plurality of SSFs may constitute an SSMF. In the embodiment of the present disclosure, a plurality of client services are packaged and coded according to a predefined SSF format, so as to generate service blocks of different client services. Moreover, according to the granularities of the different client services, a corresponding number of service blocks are mapped into the SSF or the SSMF, so as to form the SSF or the SSMF. Thus, the client services with different granularities can be transmitted at the same time. By means of the service processing method provided in the embodiment of the present disclosure, the transmission of flexible-granularity services in rigid channels is realized, the transmission requirements of low delay, low jitter, hard isolation and flexible bandwidth are met without being limited by standards such as FlexE, SPN and MTN for the minimum client service granularity. A plurality of Ethernet services, or/and TDM services can be supported at the same time, and the service rate is flexible. In addition, any one of an SPN, an MTN, the Ethernet, an OTN and the like can also be used as a service layer to transmit the SSF. Therefore, good compatibility with the existing Ethernet, FlexE, SPN, MTN, OTN and other standard systems is realized.

In the embodiment of the present disclosure, in S120, the manner of mapping the service blocks of the client services into the payload area of at least one sub slicing frame (SSF) is not specifically limited. As an optional implementation, the service blocks of different client services are mapped into the SSF or the SSMF in a slot scheduling manner. Specifically, fixed-length slot division is performed on the payload area of the SSF or the SSMF, so as to ensure that the SSF provides a fixed rate bandwidth and rigid isolation for different client services carried thereon.

Figure 3:
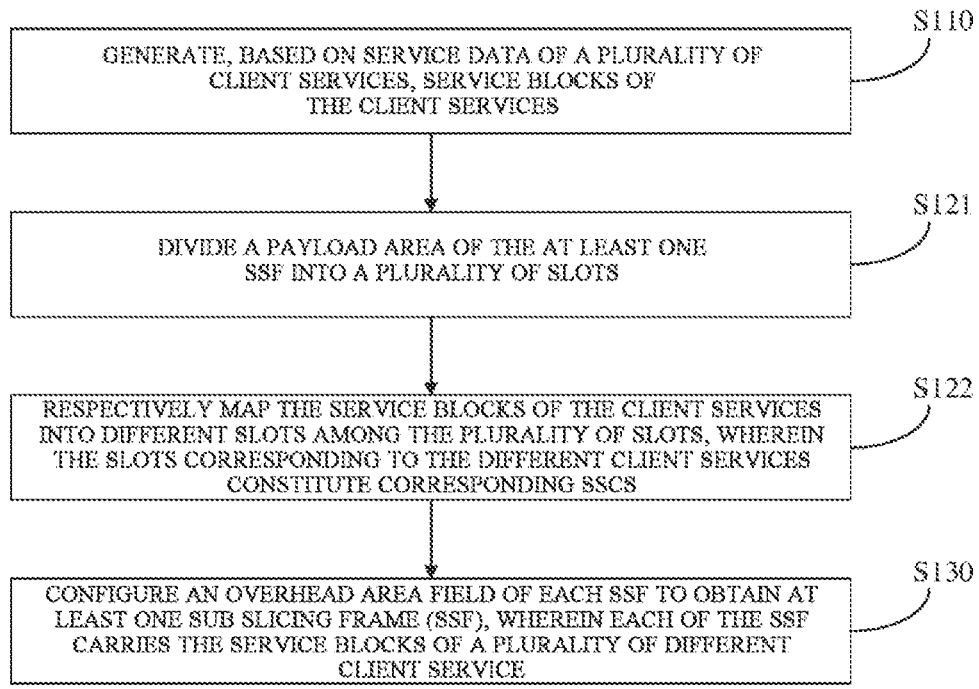
FIG. 3 is a flow diagram of some steps in another service data processing method provided in an embodiment of the present disclosure.

Correspondingly, referring to FIG. 3, in some embodiments, S120 specifically includes: S121, dividing the payload area of the at least one SSF into a plurality of slots; and S122, respectively mapping the service blocks of the client services into different slots among the plurality of slots, wherein the slots corresponding to the different client services constitute sub slicing channels (SSCs), which respectively carry the client services.

In the embodiment of the present disclosure, as an optional implementation manner, in S121, the payload area of a single SSF is divided to obtain a plurality of slots.

As another optional implementation manner, in S121, two or more SSFs constitute an SSMF, and a payload area of the SSMF is divided to obtain a plurality of slots.

In the embodiment of the present disclosure, the size of the slot obtained by dividing the payload area of the SSF or the SSMF is not specifically limited. For example, the size of the slot may be equal to the size of the service block in S110, and if the service block is a 64/66B block, which conforms to the IEEE 802.3 encoding specification, the size of the slot is 66 bits. The size of the slot may also be determined according to the granularity of each client service. Further, for example, the granularity of the client service having the minimum granularity in the plurality of client services may be determined to be the size of the slot, and the size of the slot may also be determined according to a common divisor of the granularities of the plurality of client services.

It should be noted that, in the present disclosure, when the SSF is predefined, the length of the SSF is predefined at the same time, that is, the length of the SSF is fixed. In S121, the SSF is divided into a plurality of slots according to the determined size of the slot. The rate of each slot satisfies a formula (1):

$$\text{Rateofslot} = (\text{Sizeofslot}/\text{Sizeofssf}) \times \text{Rateofserver} \quad (1)$$

Wherein Rateofslot represents the rate of the slot, Sizeofslot represents the size of the slot, Sizeofssf represents the length of the SSF, and Rateofserver represents the rate of a service layer channel.

In S122, based on the granularities of the client services and the rate of the slot determined via the formula (1), the service blocks of the client services are respectively mapped into different slots among the plurality of slots.

The relationship between the rate of the SSC, which carries the client service, and the rate of the slot meets a formula (2):

$$\text{RateofSSC} = \text{Rateofslot} \times \text{Amountofslot} \quad (2)$$

Wherein RateofSSC represents the rate of the SSC, which carries the client service, Rateofslot represents the rate of each slot, and Amountofslot represents the number of slots, which constitute the SSC.

It should be noted that, the service blocks of the same client service may be mapped into several adjacent slots, and may also be mapped into several non-adjacent slots, which is not specifically limited in the embodiment of the present disclosure. It can be understood that, a slot carrying a client service may be regarded as an SSC carrying the client service. If the slots constituting the SSCs for carrying different client services are different, the bandwidths of the SSCs for carrying different client services are also different, and the same client service may be regarded as a continuous code stream in the slot for carrying the client service.

Embodiment 1

Figure 4:
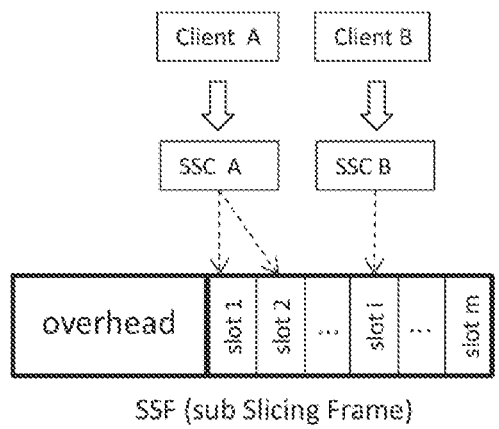
FIG. 4 is a schematic diagram of mapping client services into corresponding SSC slots in an embodiment of the present disclosure.

In the present Embodiment 1, as shown in FIG. 4, an SSF includes, but is not limited to, an overhead (OH) and a payload.

In FIG. 4, the payload of the SSF is divided into m slots, that is, slot 1 to slot m, which have the same size. The slot 1 and the slot 2 constitute an SSC A for carrying a client service Client A, and the slot i constitutes an SSC B for carrying a client service Client B. The bandwidth of the SSC A is equal to the sum of the rate of the slot 1 and the rate of the slot 2, and the bandwidth of the SSC B is equal to the rate of the slot i.

It can be understood that, in the present Embodiment 1, there may be other different client services, and each client service is carried by the SSC, which is formed by corresponding slots among slot 1~slot m in FIG. 4, and the bandwidths of the SSCs for carrying different client services may be different.

Embodiment 2

In the present Embodiment 2, the structure of the SSF is defined on the basis of the IEEE 802.3 PCS layer 64/66B encoding specification.

There are three types of 64/66B blocks, which constitute the SSF: a start block (also referred to as an S block), n data blocks (also referred to as D blocks), and a terminate block (also referred to as a T block). The length of the SSF is (n+2)*66 bits, wherein n may be valued according to different designs, that is, the SSF may also have other fixed lengths, for example, n=495, and then the length of the SSF is 32802 bits.

Figures 5, 6, 7:
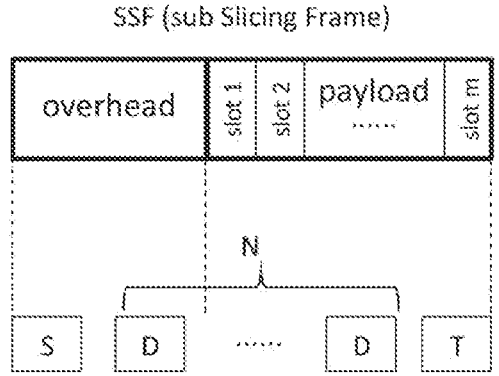
FIG. 5 is a schematic diagram of a format of a 64/66B block.
FIG. 6 is a schematic diagram of an implementation of a terminate block in an embodiment of the present disclosure.
FIG. 7 is a schematic diagram of an implementation of SSF structures and division of slots in an embodiment of the present disclosure.

In the present Embodiment 2, the S block, the D block and the T block are 66B blocks, which conform to the IEEE 802.3 PCS 64/66B encoding specification. FIG. 5 shows the format of the 64/66B block, which is specified in IEEE 802.3. As shown in FIG. 5, the first two bits of the 66B block form a sync header, which is used for distinguishing a control block from a data block. In FIG. 5, 10 represents the Control Block, and 01 represents the Data Block. The S block and the T block belong to the Control Block, and the D block belongs to the Data Block. For the Control Block, the first byte after the sync header represents a block type. In the present Embodiment 2, the block type of the first block (the S block) of the SSF is 0x78, and the block type of the last block (the T block) of the SSF is 0xFF. As shown in FIG. 6, D0-D6 bytes (bits 10-65) of the T block are payload data.

In the present Embodiment 2, the D block and the T block of the SSF are used for carrying the payload, and different client services are packaged and coded via the format of the D block or the T block, so as to generate the D block or the T block, which is taken as the service block. The S block and the first D block of the SSF are extended to carry the overhead.

FIG. 7 is a schematic diagram of dividing a single SSF into a plurality of slots in the present Embodiment 2. As shown in FIG. 7, the payload, which is carried by the second to the nth D blocks and the T block of the SSF, is divided to obtain m slots, that is, slot 1~slot m, which have the same size.

Figure 8:
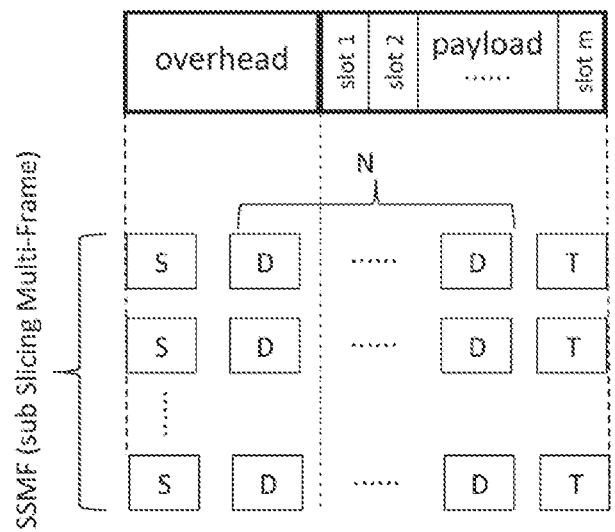
FIG. 8 is a schematic diagram of an implementation of SSMF structures and division of slots in an embodiment of the present disclosure.

FIG. 8 is a schematic diagram of dividing an SSMF into a plurality of slots in the present Embodiment 2. As shown in FIG. 8, k SSFs constituting the SSMF are divided in the same manner, that is, the payload carried by the second to the nth D blocks and the T block of each SSF is divided to obtain m slots (slot 1-slot m), which have the same size, and m×k slots are obtained in total.

Embodiment 3

In the present Embodiment 3, the structure of the SSF is defined on the basis of the IEEE 802.3 PCS layer 64/66B encoding specification. The definitions of the S block, the D block and the T block, which constitute the SSF, are described in Embodiment 2.

Figure 9:
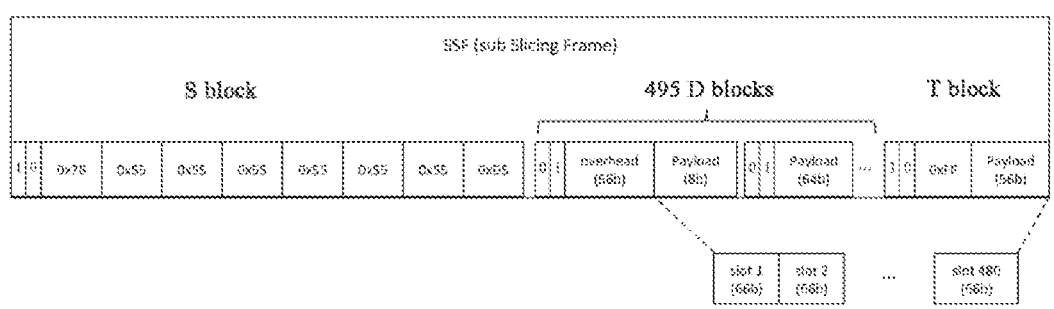
FIG. 9 is a schematic diagram of another implementation of SSF structures and division of slots in an embodiment of the present disclosure.

In the present Embodiment 3, as shown in FIG. 9, the SSF includes 1 S block, 495 D blocks and 1 T block, and the length of the SSF is 32802 bits. The first 7 bytes of the first D block, that is, 56 bits in total, are used for carrying the overhead, and the payload size of the SSF is 31680 bits. The payload of the SSF is divided into a total of 480 slots with a size of 66 bits. In the present Embodiment 3, the rate Rateofserver of the service layer channel is 5 Gb/s.

As can be seen from formula (1), the rate Rateofslot of each slot is 10.06 Mb/s.

Figure 10:
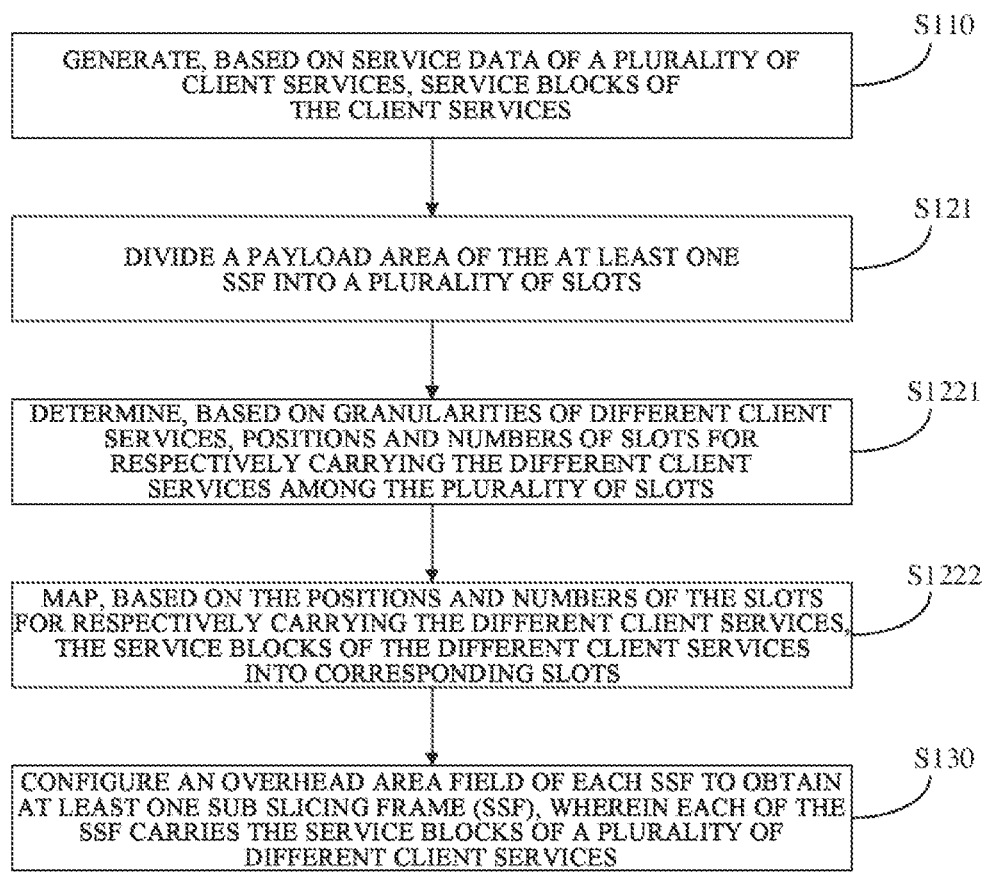
FIG. 10 is a flow diagram of some steps in another service data processing method provided in an embodiment of the present disclosure.

In some embodiments, referring to FIG. 10, S122 specifically includes: S1221, determining, based on granularities of different client services, positions and numbers of slots for respectively carrying the different client services among the plurality of slots; and S1222, mapping, based on the positions and numbers of the slots for respectively carrying the different client services, the service blocks of the different client services into corresponding slots.

In the embodiment of the present disclosure, when the payload area of the SSF or the SSMF is divided into a plurality of slots with the same size through S121, the bandwidths of SSCs formed by different numbers of slots are also different. Correspondingly, for client services with different granularities, the numbers of slots for constituting the SSCs, which are used for carrying the client services, are also different. For example, in FIG. 4, the granularity of the client service Client A is twice the granularity of the client service Client B. Correspondingly, the SSC A for carrying the client service Client A is composed of the slot 1 and the slot 2, the SSC B for carrying the client service Client B is composed of the slot i, and the bandwidth of the SSC A is twice the bandwidth of the SSC B.

In the embodiment of the present disclosure, it is not specifically limited how to determine the positions of the slots, constituting the SSCs for carrying the different client services, in the SSF or the SSMF. For example, for each client service, several consecutive slots in the SSF or an SSMF are selected, so as to constitute the SSC for carrying the client service. Alternatively, for each client service, several adjacent or non-adjacent slots are selected from the SSF or the SSMF, so as to constitute the SSC for carrying the client service. Alternatively, according to a uniform distribution manner, several slots are selected from the SSF or the SSMF, so as to constitute the SSC for carrying the client service.

Figures 11, 12:
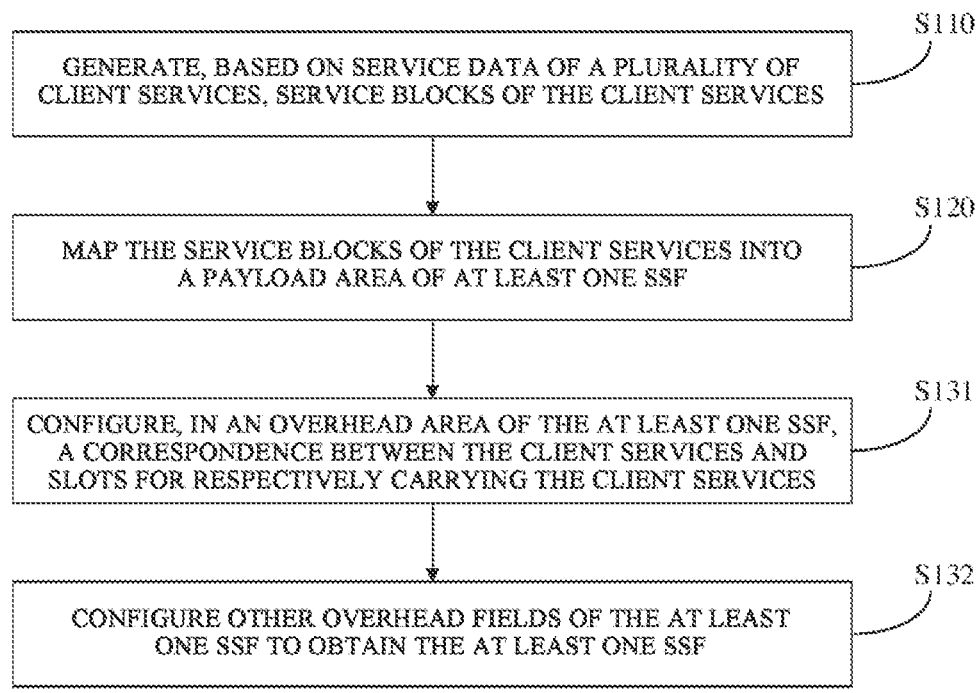
FIG. 11 is a flow diagram of some steps in yet another service data processing method provided in an embodiment of the present disclosure.
FIG. 12 is a schematic diagram of an implementation of an overhead in an SSF in an embodiment of the present disclosure.

In some embodiments, referring to FIG. 11, S130 specifically includes: S131, configuring, in an overhead area of the at least one SSF, a correspondence between the client services and the slots for respectively carrying the client services; and S132, configuring other overhead fields of the at least one SSF to obtain the at least one SSF.

Embodiment 4

In the present Embodiment 4, the structure of the SSF is defined on the basis of the IEEE 802.3 PCS layer 64/66B encoding specification. The definitions of the S block, the D block and the T block, which constitute the SSF, are described in Embodiment 2.

In the present Embodiment 4, as shown in FIG. 12, D1-D7 bytes (bits 10-65) of the S block are extended to store the overhead.

Embodiment 5

In the present Embodiment 5, the structure of the SSF is defined on the basis of the IEEE 802.3 PCS layer 64/66B encoding specification. The definitions of the S block, the D block and the T block, which constitute the SSF, are described in Embodiment 2. In the present Embodiment 5, the S block and the D block are extended to store the overhead.

As shown in FIG. 7, in the present Embodiment 5, the S block and the first D block in the SSF are extended to store the overhead.

As shown in FIG. 8, in the present Embodiment 5, In an SSMF, the S block and the first D block of each SSF, which constitutes the SSMF, are extended to store the overhead.

It should be noted that, in the embodiment of the present disclosure, the positions and sizes of the overhead in the S block, the T block and the D block of the SSF or the SSMF are not specifically limited. Embodiment 1, Embodiment 2, Embodiment 3, Embodiment 4 and Embodiment 5 are merely exemplary descriptions of the overhead carried in the S block, the T block, or the D block, and do not constitute limitations to the embodiments of the present disclosure.

In the embodiment of the present disclosure, different client services are in one-to-one correspondence with the SSCs for carrying the client services. As an optional implementation, each SSC has a channel identifier SSCID, and when the slots constituting the SSC are determined, the correspondence between the client services and the slots is determined.

Figure 13:
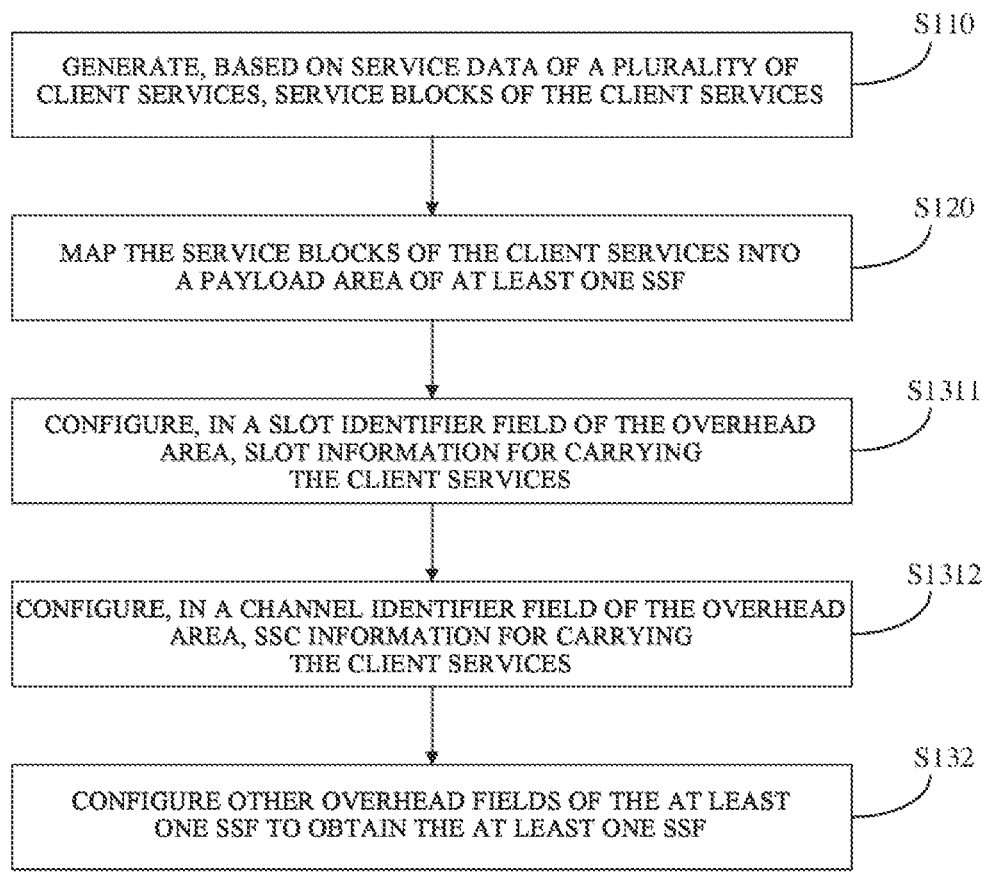
FIG. 13 is a flow diagram of some steps in yet another service data processing method provided in an embodiment of the present disclosure.

Correspondingly, in some embodiments, referring to FIG. 13, S131 specifically includes: S1311, configuring, in a slot identifier field of the overhead area, slot information for carrying the client services; and S1312, configuring, in a channel identifier field of the overhead area, SSC information for carrying the client services.

It should be noted that, the slot identifier field is used for identifying the slot for carrying the client service; and the channel identifier field is used for identifying the SSC for carrying the client service.

In the embodiment of the present disclosure, as an optional implementation, a slot identifier is a slot number. It should be noted that, in S121, when the SSF is divided to obtain a plurality of slots, the slots in the SSF are numbered to obtain the slot numbers of the slots, which are used as the slot identifiers; and in S121, when the SSMF, which is composed of a plurality of SSFs, is divided to obtain a plurality of slots, the slots in all SSFs constituting the SSMF are numbered, so as to obtain the slot numbers of the slots.

Figure 14:
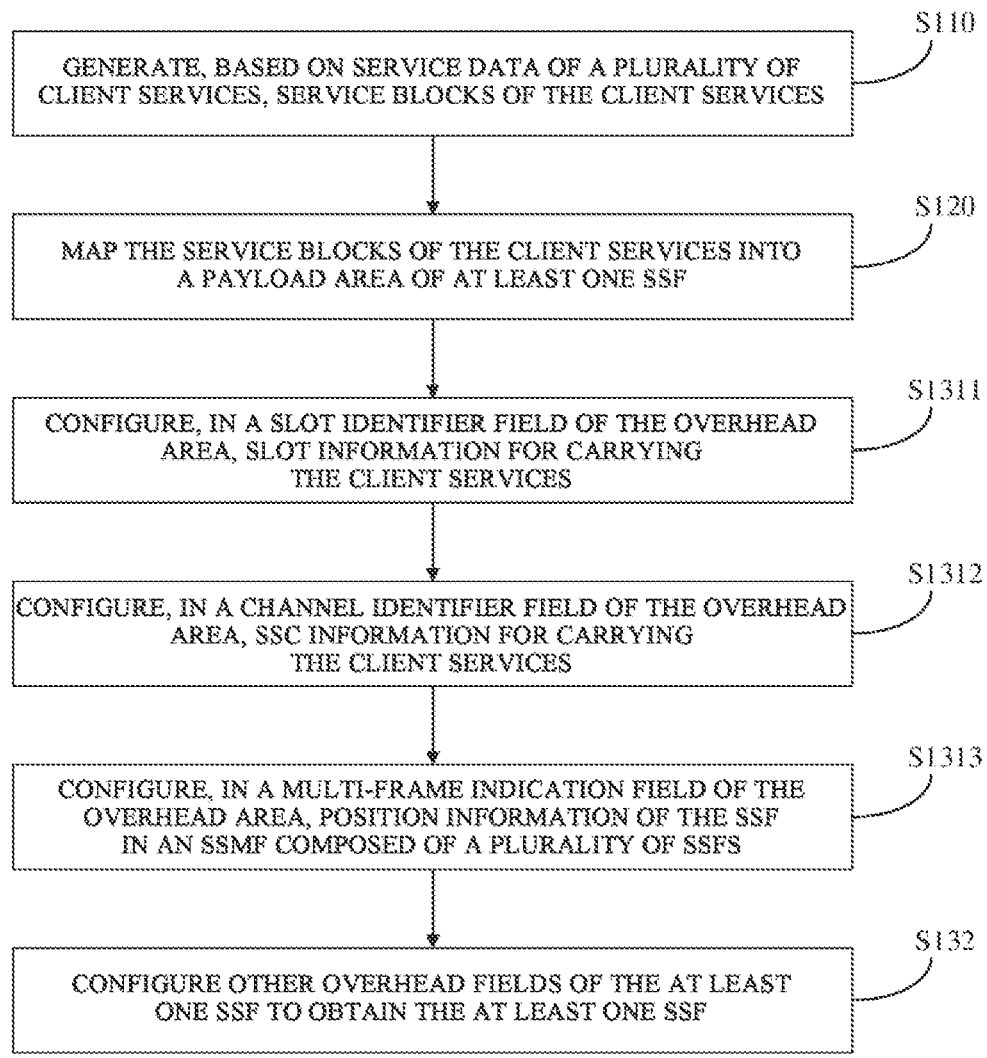
FIG. 14 is a flow diagram of some steps in yet another service data processing method provided in an embodiment of the present disclosure.

In some embodiments, when the SSMF is composed of a plurality of SSFs, referring to FIG. 14, in addition to the above S1311 to S1312, S131 further includes: S1313, configuring, in a multi-frame indication field of the overhead area, position information of the SSF in the SSMF composed of the plurality of SSFs.

In some embodiments, the other overhead fields of the SSF include: a frame type field, used for indicating the structure of the SSF; a fault indication field, used for indicating a fault condition of the service layer channel; a service type field, used for identifying the type of the client service; and a check field, used for storing check information.

Embodiment 6

In the present Embodiment 6, the structure of the SSF is defined on the basis of the IEEE 802.3 PCS layer 64/66B encoding specification. The definitions of the S block, the D block and the T block, which constitute the SSF, are described in Embodiment 2.

Figure 15:
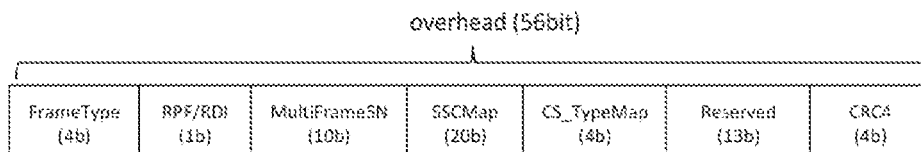
FIG. 15 is a schematic diagram of a specific field definition of an overhead in an SSF in an embodiment of the present disclosure.

In the present Embodiment 6, the first 7 bytes of the first D block (56 bits in total) are used for carrying the overhead. As shown in FIG. 15, in the present Embodiment 6, the overhead includes the following fields:

a frame type field FrameType (4 bits), which is used for indicating the definitions of different SSF structures, for example, the SSF structure is defined as FrameType=0x1, and the definitions of SSF structures of other FrameType types may be extended according to actual conditions;

a fault indication field RPF/RDI (1 bit): used for indicating an RPF (Remote PHY Fault), if the service layer is an Ethernet PHY; and used for indicating an RDI (Remote Defect Indication), if the service layer is an SCL MTN channel. As an optional implementation, if a local service layer has a fault, the RPF/RDI field is set to be 1; and if the local service layer has no fault, then the RPF/RDI field is set to be 0;

a multi-frame indication field MultiFrameSN (10 bits), which is used for indicating a sequence number of the SSF in the multi-frame, which progressively increases from 1 and circulates. As an optional implementation, the MultiFrameSN is used for indicating a slot number corresponding to SSCMap and the CS_TypeMap, that is, the slot number=MultiFrameSN. In the present optional implementation, the number of SSFs in the multi-frame is equal to the number of slots;

a channel identifier field SSCMap (20 bits), which is used for indicating an SSCID number of the SSC to which the slot belongs, and the slot being indicated by MultiFrameSN;

a service type field CS_TypeMap (4 bits), which is used for indicating a service type loaded in the slot, and the slot being indicated by MultiFrameSN. As an optional implementation, the value of the CS_TypeMap is appointed as follows: 0000b indicates that no client service is loaded, 0001b indicates that the loaded client service is an Ethernet service, and 0010b indicates that the loaded client service is a TDM service;

Reserved (13 bit): reserved, all 0; and a check field CRC 4 (4 bits), in which CRC4 check information is used for checking the first 52 bits (excluding the CRC4) in the overhead; an algorithm polynomial is: X4+X+1, and the initial value is 0; a high bit of a CRC check result is stored in bit 53, and the lowest bit is stored in bit 56; and the CRC4 may also be used for identifying the SSF.

Figure 16:
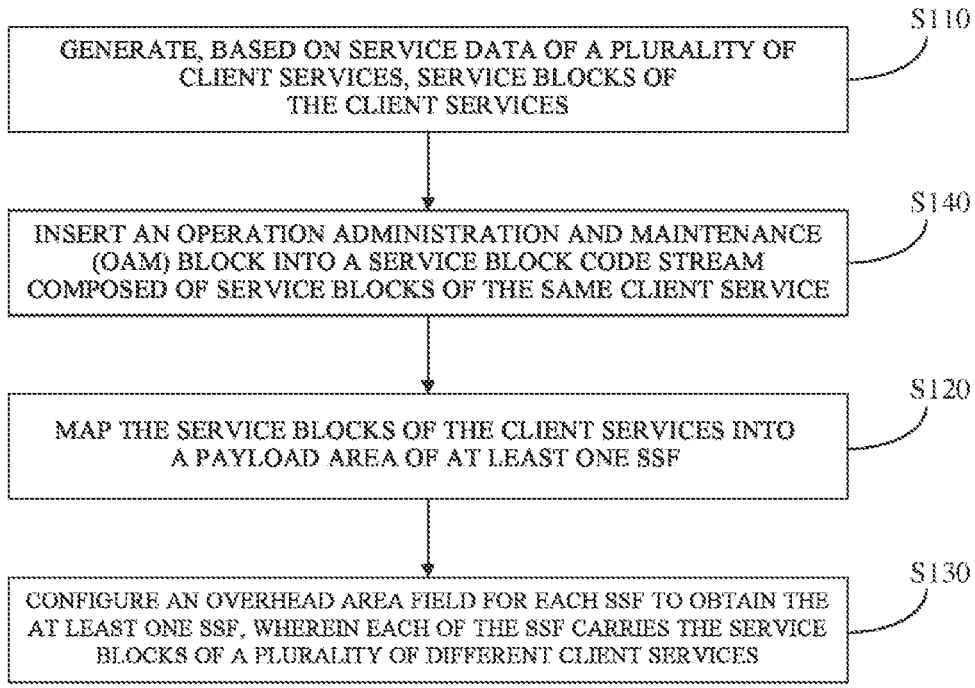
FIG. 16 is a flow diagram of some steps in yet another service data processing method provided in an embodiment of the present disclosure.

In some embodiments, referring to FIG. 16, after S110, the service data processing method further includes: S140, inserting an operation administration and maintenance (OAM) block into a service block code stream, which is composed of the service blocks of the same client service.

It should be noted that, after the OAM block is inserted into the service block code stream, in S120, the service blocks and the OAM block of the client services are mapped into the SSF or the SSMF.

Embodiment 7

In the present Embodiment 7, the structure of the SSF is defined on the basis of the IEEE 802.3 PCS layer 64/66B encoding specification. The definitions of the S block, the D block and the T block, which constitute the SSF, are described in Embodiment 2.

In the present Embodiment 7, the client services are packaged and coded to generate a 64/66B block code stream, and the OAM block may be inserted into an inter packet gap (IPG) position of the service code stream in the SSC. In the present Embodiment 7, an OAM block insertion/extraction mechanism and the definition of the OAM block may directly use an SCL OAM (or Path OAM of MTN) mechanism and definition of the SPN, that is, the service code stream in the SSC is taken as a service code stream in a low-speed SPN SCL (or MTN Path).

Figure 17:
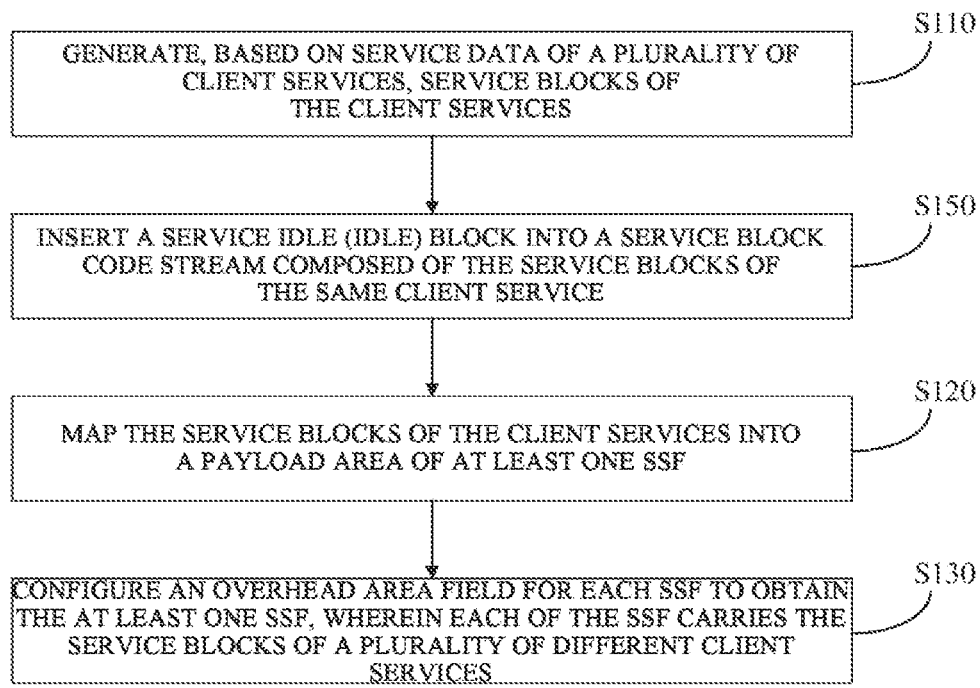
FIG. 17 is a flow diagram of some steps in yet another service data processing method provided in an embodiment of the present disclosure.

In some embodiments, referring to FIG. 17, after S110, the service data processing method further includes: S150, inserting a service Idle block into a service block code stream, which is composed of the service blocks of the same client service.

It should be noted that, the service Idle block is a service block, on which no client service is loaded. In the embodiment of the present disclosure, the service Idle block may be added or deleted, so as to adapt to the rate of the client service and the rate of the slot.

It should be further noted that, after the service Idle block is inserted into the service block code stream, in S120, the service blocks and the service Idle block of the client services are mapped into the SSF or the SSMF.

Figure 18:
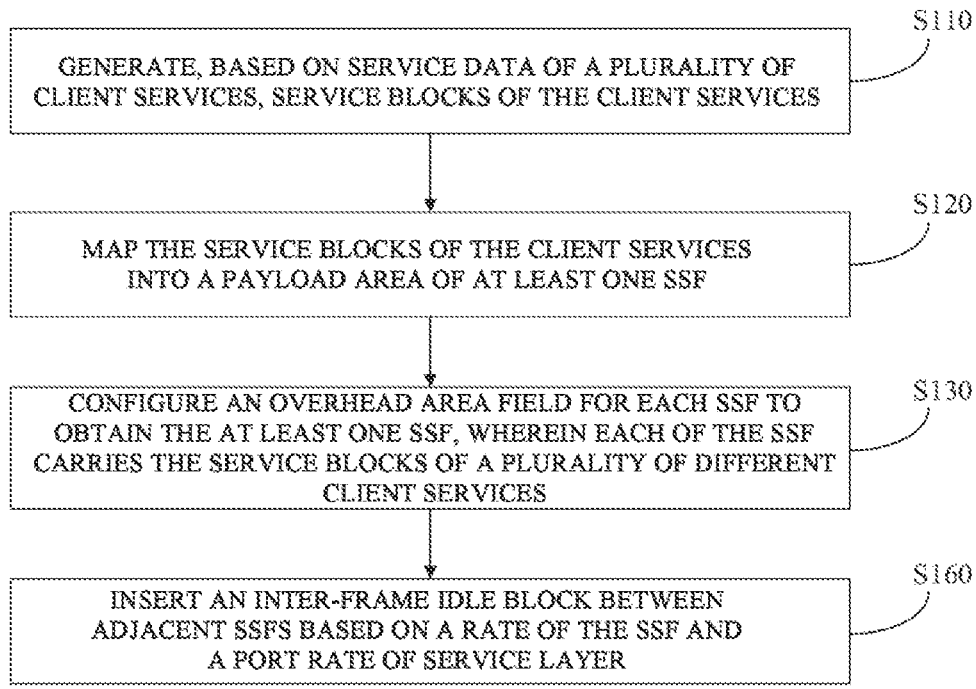
FIG. 18 is a flow diagram of some steps in yet another service data processing method provided in an embodiment of the present disclosure.

In some embodiments, referring to FIG. 18, after S130, the service data processing method further includes: S160, inserting, based on the rate of the SSF and a port rate of the service layer, an inter-frame Idle block between the adjacent SSFs.

Embodiment 8

In the present Embodiment 8, the structure of the SSF is defined on the basis of the IEEE 802.3 PCS layer 64/66B encoding specification. The definitions of the S block, the D block and the T block, which constitute the SSF, are described in Embodiment 2.

Figure 19:
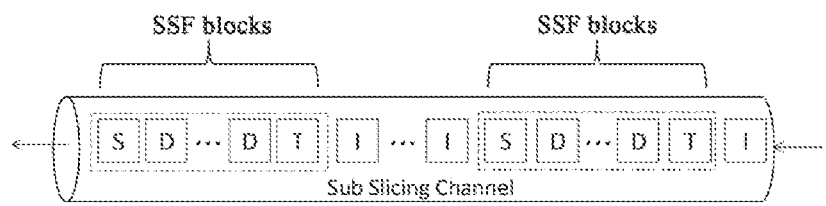
FIG. 19 is a schematic diagram of an implementation of an SSC data stream in an embodiment of the present disclosure.

In the present Embodiment 8, the S block+the D block+ the T block, which conform to the definition of the structure of the SSF, are referred to as SSF blocks. As shown in FIG. 19, in the present Embodiment 8, a data stream in the SSC is composed of an SSF block and an inter-frame Idle block. In FIG. 19, an I block is the inter-frame Idle block. In the present Embodiment 8, the block type of the inter-frame Idle block is 0x1E, and there may be 0 or more inter-frame Idle blocks between the SSF blocks. The inter-frame Idle blocks in the SSC may be added or deleted, so as to adapt to the rate of the SSF and the rate of the service layer.

In some embodiments, the SSF in the embodiments of the present disclosure are composed of 64/66B blocks, which conforms to the IEEE 802.3 encoding specification.

In some embodiments, the SSF includes a start block, at least one data block and a terminate block, and the frame length of the SSF is fixed.

For definitions of the SSF and the start block, the data block, the terminate block and the like in the SSF, reference may be made to Embodiment 2, and thus details are not described herein again.

In some embodiments, the service data processing method further includes: carrying the payload of the SSF in the data block and/or the terminate block; and carrying the overhead of the SSF in at least one of the start block, the data block and the terminate block.

For a specific implementation manner of carrying the overhead of the SSF in at least one of the start block, the data block and the terminate block, reference may be made to Embodiment 2 to Embodiment 5, and thus details are not described herein again.

As described above, in the embodiment of the present disclosure, the client service may be an Ethernet service, and may also be a TDM service.

Correspondingly, in some embodiments, the client service includes an Ethernet service.

It should be noted that, for the Ethernet service, the code stream of a 64/66B block is formed after IEEE 802.3 PCS encoding is performed.

In some embodiments, the 64/66B block in the code stream of the Ethernet service is directly used as the service block in S110, and in S120, the Ethernet service blocks of different client services are mapped into the at least one SSF.

In some embodiments, in S110, compression transcoding is performed on the Ethernet service blocks of the client services to generate the service blocks.

Embodiment 9

In the present Embodiment 9, compression transcoding is performed on the 64/66B blocks of the Ethernet service by using 256/257B encoding to generate the service blocks of the Ethernet service.

In the present Embodiment 9, the transcoding mode from 64/66B encoding to 256/257B encoding follows the IEEE 802.3 standard, that is, four 64/66B blocks are compressed into one 256/257B block by compression transcoding.

Embodiment 10

In the present Embodiment 10, compression transcoding is performed on the 64/66B blocks of the Ethernet service by using 65B encoding to generate the service blocks of the Ethernet service.

In the present Embodiment 10, when the 64/66B block is compressed into a 65B block by compression transcoding, 2 bits of the sync header of the 64/66B block are compressed to 1 bit. For example, it is possible to only take the first bit of the sync header of the 64/66B block, and delete the second bit; and it is also possible to only take the second bit of the sync header of the 64/66B block, and delete the first bit.

In some embodiments, the client service includes a time division multiplexing (TDM) service.

Embodiment 11

According to circuit emulation services over Ethernet (CESoETH) specified in the standard "MEF8 Implementation Agreement for the Emulation of PDH Circuits over Metro Ethernet Networks", which is published by the Standard Organization Metro Ethernet Forum (MEF), the TDM service is mapped and packaged into an Ethernet message; and the service block of the TDM service is generated by using the Ethernet message, in which the TDM service is packaged, according to Embodiment 9 or Embodiment 10.

Embodiment 12

A bit stream of the TDM service at a constant rate is directly packaged and coded according to service bytes or bits, so as to generate a 64/66B block, which conforms to the IEEE 802.3 encoding specification, as the service block of the TDM service.

Figure 20:
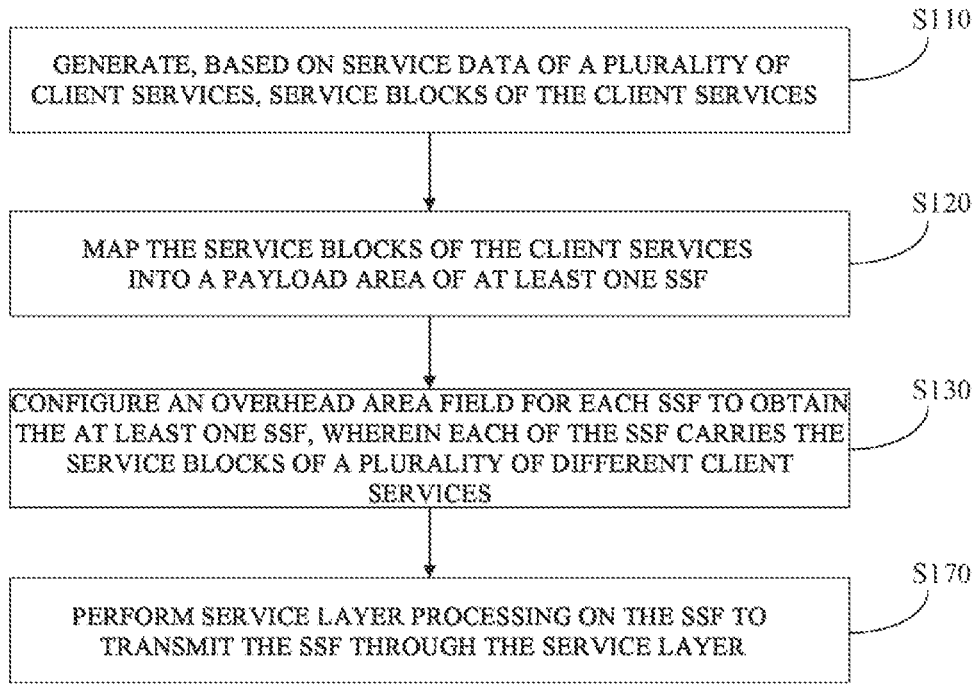
FIG. 20 is a flow diagram of some steps in yet another service data processing method provided in an embodiment of the present disclosure.

In some embodiments, referring to FIG. 20, in addition to S110 to S130, the service data processing method further includes: S170, performing service layer processing on the SSF to transmit the SSF through the service layer.

In some embodiments, the service layer includes any one of an IEEE 802.3 Ethernet port physical layer (Ethernet PHY), a slicing packet network (SPN), a metro transport network (MTN), a flexible Ethernet (FlexE), and an optical transport network (OTN).

When the service layer is an IEEE 802.3 Ethernet port physical layer (PHY), that is, on the source PE node, when data is sent by the IEEE 802.3 Ethernet PHY, S170 specifically includes: performing scrambling and block distributing of an IEEE 802.3 physical coding sublayer (PCS), on the SSF in the form of a 64/66B block, passing through a physical medium adaptation layer (PMA) and a physical medium association layer interface (PMD), and then sending the SSF from an Ethernet port.

When the service layer is a slicing packet network (SPN), a metro transport network (MTN), a flexible Ethernet (FlexE), or an optical transport network (OTN), in S170, the SSF is sent after being subjected to corresponding service layer processing.

Figure 21:
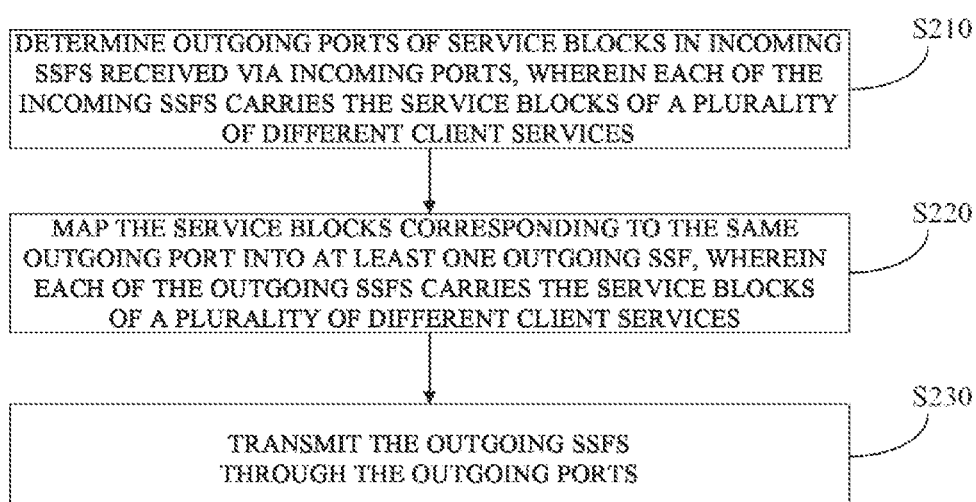
FIG. 21 is a flow diagram of a service data exchange method provided in an embodiment of the present disclosure.

According to a second aspect, referring to FIG. 21, an embodiment of the present disclosure provides a service data exchange method, including: S210, determining outgoing ports of service blocks in incoming SSFs received via incoming ports, wherein each of the incoming SSFs carries the service blocks of a plurality of different client services; S220, mapping the service blocks corresponding to the same outgoing port into at least one outgoing SSF, wherein each of the outgoing SSFs carries the service blocks of a plurality of different client services; and S230, transmitting the outgoing SSFs through the outgoing ports.

It should be noted that, in a provider exchange device (provider) or a P node, a port receiving the SSF is an incoming port, and a port sending the SSF is an outgoing port. Correspondingly, an SSF received by the incoming port is an incoming SSF, and an SSF sent by the outgoing port is an outgoing SSF.

In an embodiment of the present disclosure, the incoming SSF, which is received via the incoming port of the P node, carries the service blocks of a plurality of different client services, and the different client services correspond to different outgoing ports. In the P node, the service blocks of the client services in the incoming SSFs are transmitted to the corresponding outgoing port, and in the outgoing ports, the service blocks of the different client services are remapped and assembled into the outgoing SSFs, so as to send the outgoing SSFs from the outgoing port. It can be understood that, each outgoing SSF carries different client services.

It should be noted that, the incoming port may also receive an incoming SSMF composed of a plurality of incoming SSFs. In the outgoing port, a plurality of outgoing SSFs may also form an outgoing SSMF, and the service blocks of different client services are mapped into the SSMF.

According to the service data exchange method provided in the embodiment of the present disclosure, on the basis of a plurality of SSFs, which are capable of carrying a plurality of different client services, or an SSMF composed of a plurality of SSFs, different client services are exchanged between the incoming port and the outgoing port of the P node, thereby establishing an SSC for carrying the different client services, and the client services with different granularities can be transmitted at the same time. By means of the service data exchange method provided in the embodiment of the present disclosure, the transmission of flexible-granularity services in rigid channels is realized, the transmission requirements of low delay, low jitter, hard isolation and flexible bandwidth are met without being limited by standards such as FlexE, SPN and MTN for the minimum client service granularity. A plurality of Ethernet services, or/and TDM services can be supported at the same time, and the service rate is flexible. In addition, any one of an SPN, an MTN, the Ethernet, an OTN and the like can also be used as a service layer to transmit the SSFs, so that good compatibility with the existing Ethernet, FlexE, SPN, MTN, OTN and other standard systems is realized.

As an optional implementation, in the embodiment of the present disclosure, slot crossover from a slot in an incoming SSF to a slot in an outgoing SSF, or from a slot in an incoming SSMF to a slot in an outgoing SSMF, is performed in the P node in a slot scheduling manner.

Figure 22:
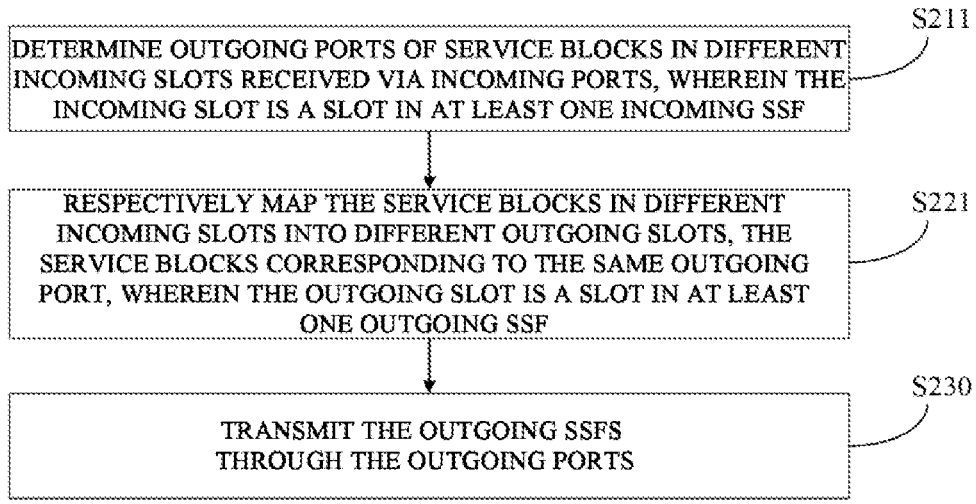
FIG. 22 is a flow diagram of some steps in another service data exchange method provided in an embodiment of the present disclosure.

Correspondingly, referring to FIG. 22, S210 specifically includes: S211, determining outgoing ports of service blocks in different incoming slots received via the incoming ports, wherein the incoming slot is a slot in at least one incoming SSF; and S220 specifically includes: S221, respectively mapping service blocks in different incoming slots into different outgoing slots, the service blocks corresponding to the same outgoing port, wherein the outgoing slot is a slot in at least one outgoing SSF.

Figure 23:
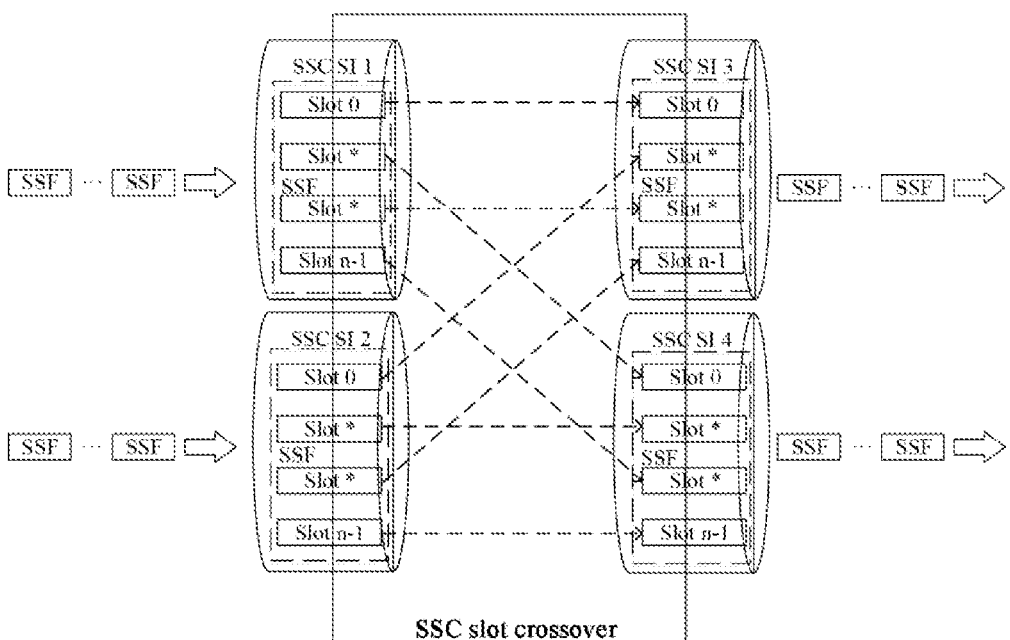
FIG. 23 is a schematic diagram of an implementation of slot crossover in an embodiment of the present disclosure.

FIG. 23 illustrates an optional implementation of slot crossover in the P node.

In FIG. 23, the P node has two incoming ports SSC SI 1 and SSC SI 2, and two outgoing ports SSC SI 3 and SSC SI 4. Some slots in the incoming SSF received by the SSC SI 1 correspond to some slots of the outgoing SSF in the SSC SI 3, and some slots correspond to some slots of the outgoing SSF in the SSC SI 4. Similarly, some slots in the incoming SSF received by the SSC SI 2 correspond to some slots of the outgoing SSF in the SSC SI 3, and some slots correspond to some slots of the outgoing SSF in the SSC SI 4.

As an optional implementation, in the embodiment of the present disclosure, the P node stores a correspondence between slots of incoming SSFs or incoming SSMFs in different incoming ports and slots of outgoing SSFs or outgoing SSMFs in different outgoing ports.

Figure 24:
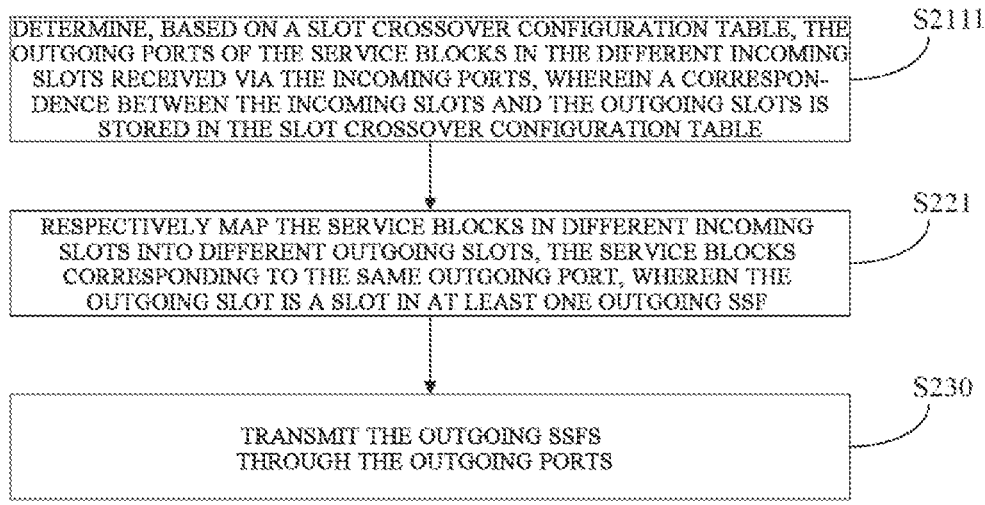
FIG. 24 is a flow diagram of some steps in another service data exchange method provided in an embodiment of the present disclosure.

Correspondingly, in some embodiments, referring to FIG. 24, S211 specifically includes: S2111, determining, based on a slot crossover configuration table, the outgoing ports of the service blocks in the different incoming slots received via the incoming ports, wherein a correspondence between the incoming slots and the outgoing slots is stored in the slot crossover configuration table.

It should be noted that, in the embodiment of the present disclosure, the slot crossover configuration table may be pre-configured by a webmaster, a software defined network (SDN) controller, or a dynamic protocol.

In the embodiment of the present disclosure, there may be a slight rate difference (not greater than 200 ppm) the outgoing ports and the incoming ports of the P node. As an optional implementation, a service Idle block in the slot of the SSF or the SSMF may be added or deleted in a sending direction, so as to adapt to the rate of the slot of the incoming port to the slot of the outgoing port.

Figure 25:
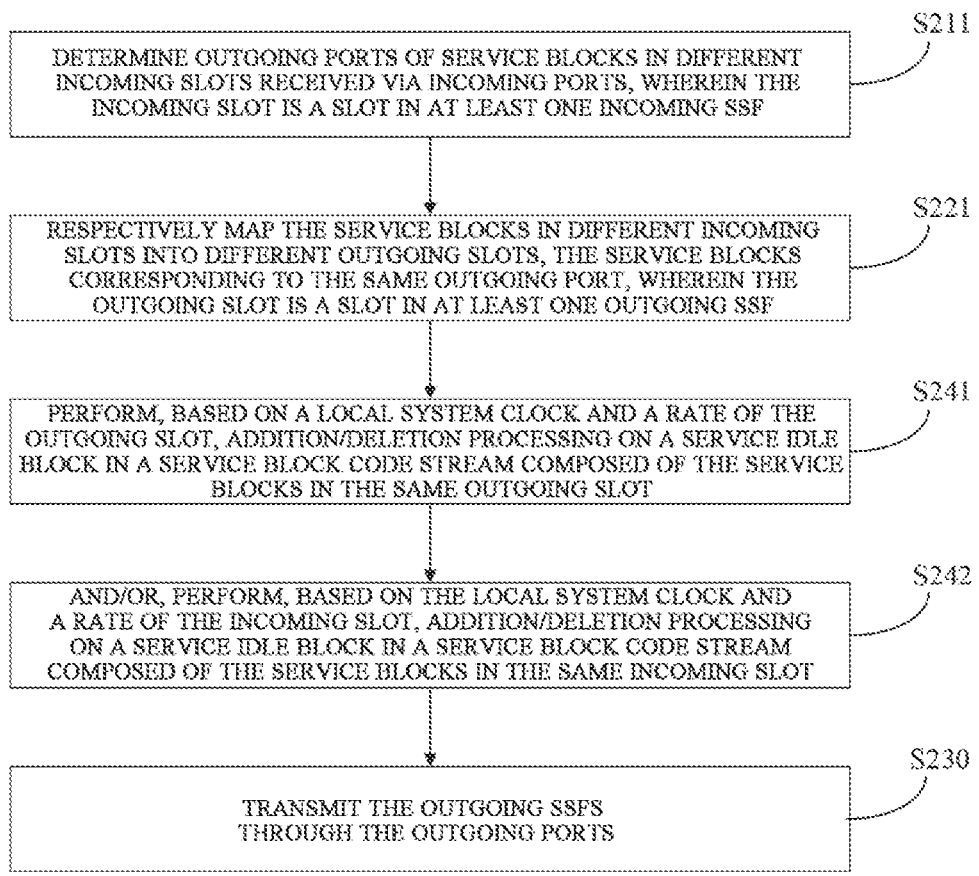
FIG. 25 is a flow diagram of some steps in yet another service data exchange method provided in an embodiment of the present disclosure.

Correspondingly, in some embodiments, referring to FIG. 25, in addition to S211 to S221, the service data exchange method further includes: S241, performing, based on a local system clock and a rate of the outgoing slot, addition/deletion processing on a service idle block in a service block code stream composed of the service blocks in the same outgoing slot, and/or, S242, performing, based on the local system clock and a rate of the incoming slot, addition/deletion processing on a service idle block in a service block code stream composed of the service blocks in the same incoming slot.

It should be noted that, in the embodiment of the present disclosure, it is possible to only execute S241 and not execute S242; it is also possible to only execute S242 and not execute S241; and it is also possible to execute S241 and S242 at the same time. For example, when the rate of the client service in the outgoing slot needs to be adapted to the rate of the outgoing slot, S241 is executed; when the rate of the client service in the incoming slot needs to be adapted to the rate of the incoming slot, S242 is executed; and when the rate of the client service in the incoming slot needs to be adapted to the rate of the incoming slot, and the rate of the client service in the outgoing slot needs to be adapted to the rate of the outgoing slot, S241 and S242 are executed at the same time. In addition, the sequence of executing S241 and/or S242 is not specifically limited in the present disclosure.

In an embodiment of the present disclosure, there also may be a slight difference between the rate of the outgoing SSF and the rate of the outgoing port. As an optional implementation, an inter-frame Idle block is inserted between the SSFs, so as to adapt to the rate of the SSF and the rate of the service layer.

Figure 26:
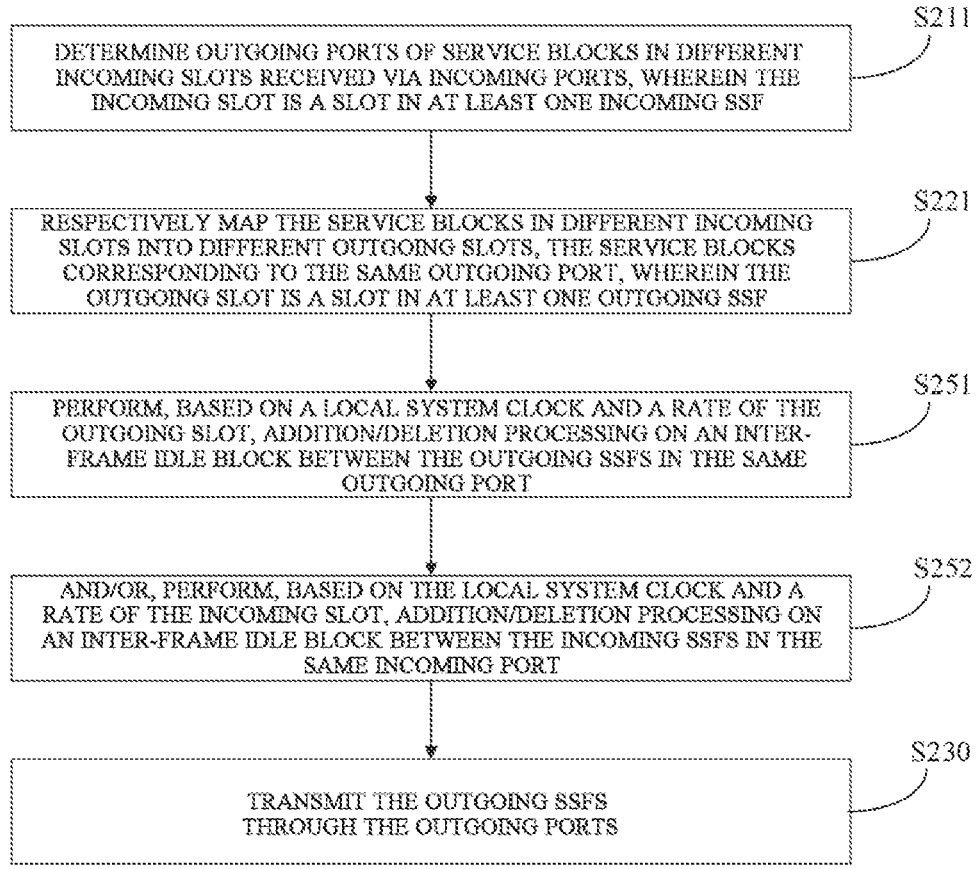
FIG. 26 is a flow diagram of some steps in yet another service data exchange method provided in an embodiment of the present disclosure.

Correspondingly, in some embodiments, referring to FIG. 26, in addition to S211 to S221, the service data exchange method further includes: S251, performing, based on a local system clock and a rate of the outgoing slot, addition/deletion processing on an inter-frame Idle block between the outgoing SSFs in the same outgoing port, and/or, S252, performing, based on the local system clock and a rate of the incoming slot, addition/deletion processing on an inter-frame Idle block between the incoming SSFs in the same incoming port.

It should be noted that, in the embodiment of the present disclosure, it is possible to only execute S251 and not execute S252; it is also possible to only execute S252 and not execute S251; and it is also possible to execute S251 and S252 at the same time. For example, when the rate of the SSF in the outgoing slot needs to be adapted to the rate of the service layer of the outgoing port, S251 is executed; when the rate of the SSF in the incoming slot needs to be adapted to the rate of the service layer of the incoming slot, S252 is executed; and when the rate of the SSF in the incoming slot needs to be adapted to the rate of the service layer of the incoming port, and the rate of the SSF in the outgoing port needs to be adapted to the rate of the service layer of the outgoing port, S251 and S252 are executed at the same time. In addition, the sequence of executing S251 and/or S252 is not specifically limited in the present disclosure.

In some embodiments, the incoming port and/or the outgoing port includes any one of an Ethernet port, a slicing channel layer (SCL) port, an MTN Path channel port, a FlexE Client port, and an ODUk interface of an OTN.

Figure 27:
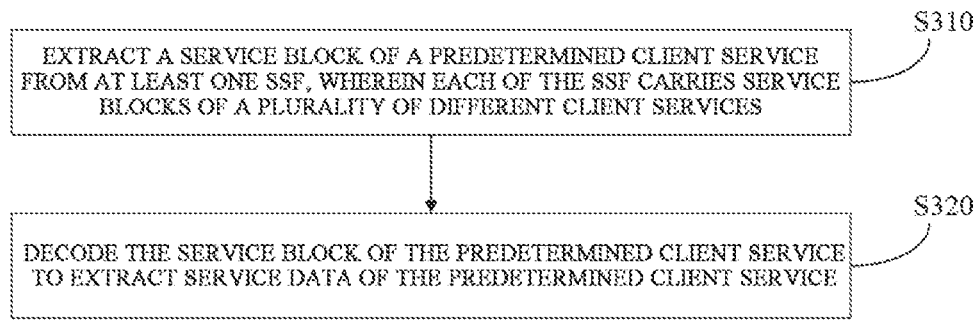
FIG. 27 is a flow diagram of a service data extraction method provided in an embodiment of the present disclosure.

According to a third aspect, referring to FIG. 27, an embodiment of the present disclosure provides a service data extraction method, including: S310, extracting a service block of a predetermined client service from at least one SSF, wherein each of the SSF carries service blocks of a plurality of different client services; and S320, decoding the service block of the predetermined client service, so as to extract service data of the predetermined client service.

It should be noted that, in the embodiment of the present disclosure, the predetermined client service is a client service, which is sent by a source PE node to the current host PE node. After receiving an SSF or an SSMF, the host PE node extracts the service block of the predetermined client service from the SSF or the SSMF, and decodes the service block of the predetermined client service, so as to extract the service data of the client service.

It should also be noted that, the process of decoding the service block of the predetermined client service in the host PE node is an inverse process of generating the service block according to the client service in the source PE node.

By means of the service data extraction method provided in the embodiment of the present disclosure, the predetermined client service can be extracted from the SSF, which is capable of bearing a plurality of different client services, or from the SSMF composed of a plurality of SSFs, an SSC from the source PE node to the host PE node is established, and the bandwidths of the SSCs corresponding to client services with different granularities are different. By means of the service data extraction method provided in the embodiment of the present disclosure, the transmission of flexible-granularity services in rigid channels is realized, the transmission requirements of low delay, low jitter, hard isolation and flexible bandwidth are met without being limited by standards such as FlexE, SPN and MTN for the minimum client service granularity. A plurality of Ethernet services, or/and TDM services can be supported at the same time, and the service rate is flexible. In addition, any one of an SPN, an MTN, the Ethernet, an OTN and the like can also be used as a service layer to transmit the SSFs, so that good compatibility with the existing Ethernet, FlexE, SPN, MTN, OTN and other standard systems is realized.

As an optional implementation, in an embodiment of the present disclosure, the host PE node extracts, in a slot scheduling manner, the service block of the predetermined client service from the slot of the SSF or the SSMF.

Figure 28:
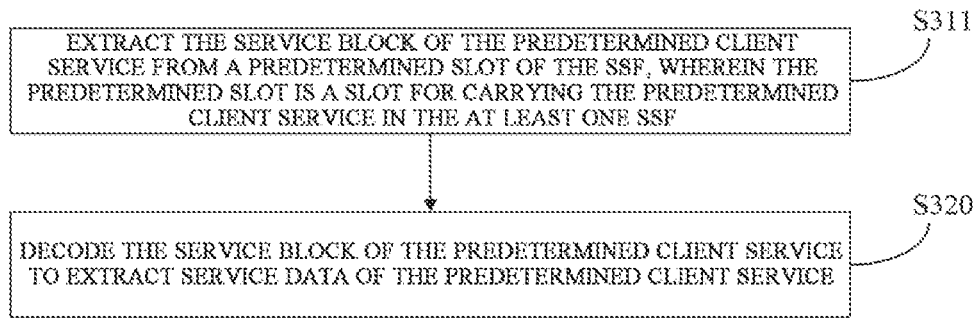
FIG. 28 is a flow diagram of some steps in another service data extraction method provided in an embodiment of the present disclosure.

Correspondingly, in some embodiments, referring to FIG. 28, S310 specifically includes: S311, extracting the service block of the predetermined client service from a predetermined slot of the SSF, wherein the predetermined slot is a slot for carrying the predetermined client service in the at least one SSF.

Figure 29:
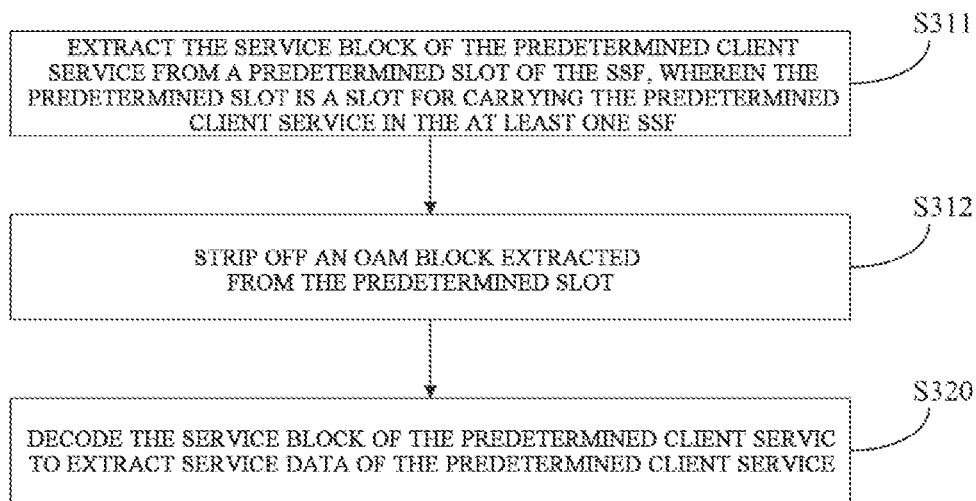
FIG. 29 is a flow diagram of some steps in yet another service data extraction method provided in an embodiment of the present disclosure.

In some embodiments, referring to FIG. 29, after S311, the service data extraction method further includes: S312, stripping off an OAM block extracted from the predetermined slot.

As described above, in the embodiment of the present disclosure, the predetermined client service may be an Ethernet service and may also be a TDM service.

Correspondingly, in some embodiments, the predetermined client service includes an Ethernet service.

In some embodiments, the source PE node directly uses a 64/66B block in a code stream of the Ethernet service as the service block of the predetermined service, and in S320, a 64/66B Ethernet service block, which conforms to the IEEE 802.3 encoding specification, of the predetermined client service is decoded to extract the service data of the predetermined client service.

In some embodiments, the source PE node performs compression transcoding on an Ethernet service block of the predetermined client service, so as to generate the service block of the predetermined client service. At this time, it is necessary to decompress the service block of the predetermined client service into the 64/66B Ethernet service block, which conforms to the IEEE 802.3 encoding specification, and the 64/66B Ethernet service block is decoded to extract the service data of the predetermined client service.

Embodiment 13

In the present Embodiment 13, the source PE node performs, by using 256/257B encoding, compression transcoding on the 64/66B block of the Ethernet service, so as to generate the service block of the predetermined client service. Correspondingly, the host PE node decompresses, by using the 256/257B coding, the service block of the predetermined client service into the 64/66B Ethernet service block.

The transcoding mode from 256/257B coding to 64/66B coding follows the IEEE 802.3 standard, that is, one 256/257B block is decompressed into four 64/66B blocks by decompression transcoding.

Embodiment 14

In the present Embodiment 14, the source PE node performs, by using 65B coding, compression transcoding on the 64/66B block of the Ethernet service, so as to generate the service block of the predetermined client service. Correspondingly, the host PE node decompresses, by using the 65B coding, the service block of the predetermined client service into the 64/66B Ethernet service block.

It should be noted that, during the process of compressing the 64/66B block into a 65B block by compression transcoding, if the source PE node deletes the first bit in the sync header of the 64/66B block, in the present Embodiment 14, a bit is newly added in front the first bit of the sync header of the 65B block. During the process of compressing the 64/66B block into the 65B block by compression transcoding, if the source PE node deletes the second bit in the sync header of the 64/66B block, in the present Embodiment 14, a bit is newly added behind the first bit of the sync header of the 65B block.

In some embodiments, the predetermined client service includes a time division multiplexing (TDM) service.

Embodiment 15

In the present Embodiment 15, according to circuit emulation services over Ethernet (CESoETH) specified in the standard "MEF8 Implementation Agreement for the Emulation of PDH Circuits over Metro Ethernet Networks", which is published by the Standard Organization Metro Ethernet Forum (MEF), the source PE node maps and packages the TDM service into an Ethernet message, and generates the service block of the predetermined client service according to Embodiment 9 or Embodiment 10. Correspondingly, the host PE node de-maps the service block of the predetermined client service into a TDM service code stream based on the CESoETH, and extracts the service data of the predetermined client service from the TDM service code stream.

Embodiment 16

In the present Embodiment 16, the source PE node directly packages and codes the bit stream of the TDM service of a constant rate according to service bytes or bits, so as to generate a 64/66B block, which conforms to the IEEE 802.3 coding specification, as the service block of the predetermined client service. Correspondingly, in the host PE node, the 64/66B block is decoded into the TDM service code stream according to the IEEE 802.3 coding specification, and the service data of the predetermined client service is extracted from the TDM service code stream.

Embodiment 17

Figure 30:
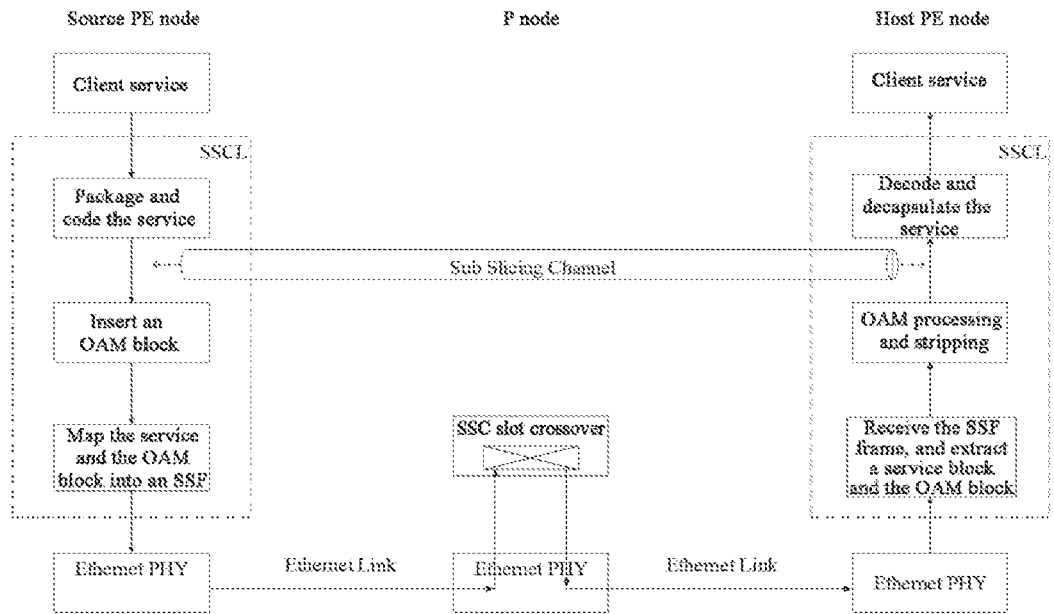
FIG. 30 is a schematic diagram of an implementation of constructing an SSC in an embodiment of the present disclosure.

In the present Embodiment 17, as shown in FIG. 30, the service layer is the Ethernet, and by means of slot crossover of an Ethernet link and an SSC layer of a P node, an end-to-end SSC for carrying flexible-granularity services (i.e., the Sub Slicing Channel in FIG. 30) is established. As shown in FIG. 30, standard Ethernet links (e.g., 10 GE) are formed between the source PE node and the P node, and between the host PE node and the P node. The client services carried in the two Ethernet links form an end-to-end SSC from the source PE node to the host PE node by means of SSC slot crossover.

Embodiment 18

Figure 31:
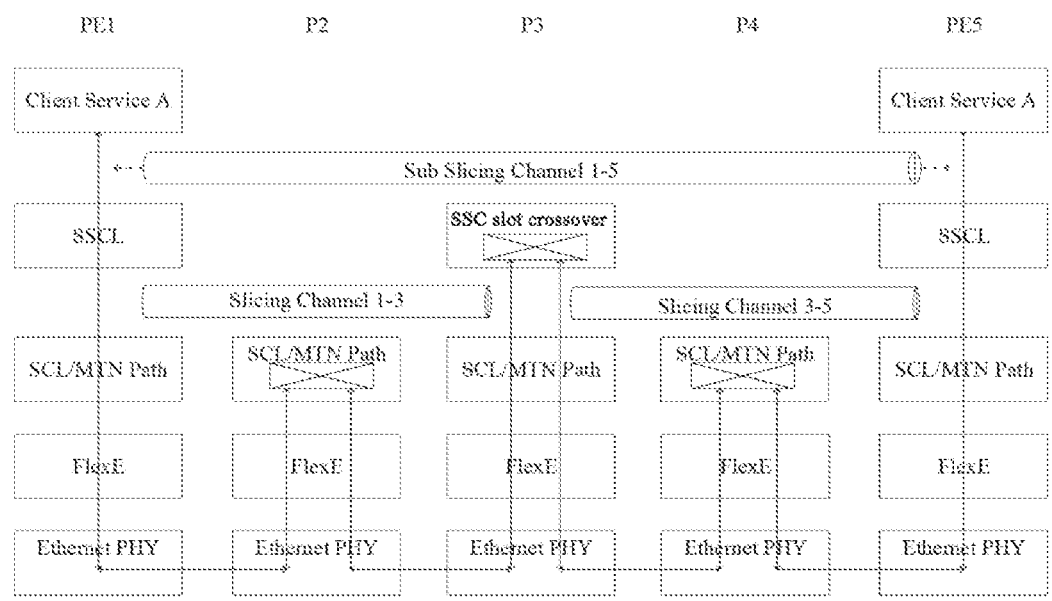
FIG. 31 is a schematic diagram of another implementation of constructing an SSC in an embodiment of the present disclosure.

In the present Embodiment 18, as shown in FIG. 31, the service layer is an SPN, and by means of slot crossover of a Slicing Channel connection provided by the SPN and the SSC layer of a P3 node, an end-to-end SSC for carrying flexible-granularity services (i.e., the Sub Slicing Channel 1-5 in FIG. 31) is established. As shown in FIG. 31, by means of SCL crossover of P nodes P2 and P4, service layer channels of the SSC (i.e., Slicing Channel 1-3 and Slicing Channel 3-5) are formed. The SSC, which is used for carrying the Client Service A, in the two SCL channels forms, at the P3 node and by means of slot crossover, an end-to-end SSC from a PE1 node to a PE5 node, which is used for carrying the Client Service A, that is, the Sub Slicing Channel 1-5 in FIG. 31.

Figure 32:
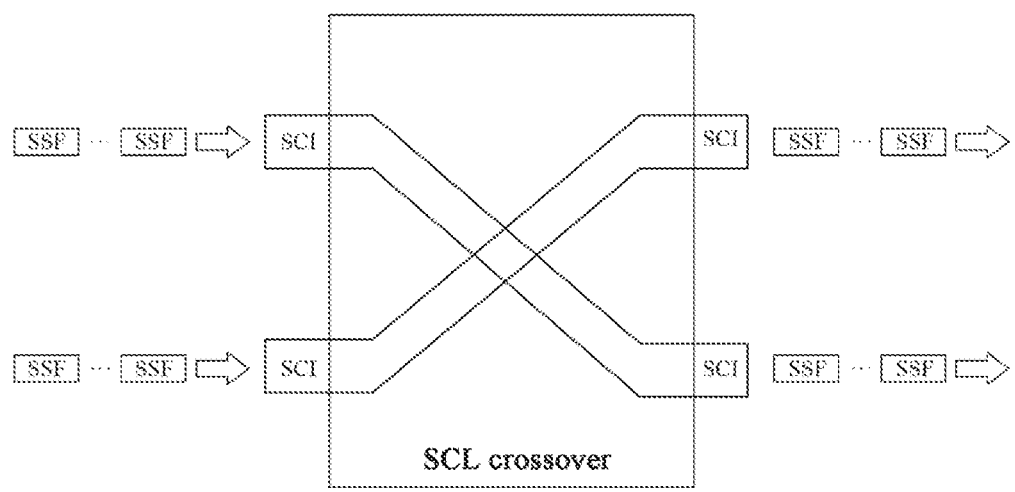
FIG. 32 is a schematic diagram of an implementation of SCL crossover in an embodiment of the present disclosure.

For the SCL crossover of the SPN SCL layers of the P2 node and the P4 node, since the SSF is a standard S+D+T structure, the SSF is service data for the SCL (or MTN Path), and the SCL (or MTN Path) does not need to perceive the SSF and directly completes the SCL (or MTN Path) layer crossover. The SCL (or MTN Path) crossover manner of the P2 node or the P4 node is shown in FIG. 32.

In addition, since the P2 node and the P4 node only complete SCL (or MTN Path) crossover, and do not need to perceive the SSFs, the P2 node and the P4 node may be conventional SPN devices, while the PE1 node, the P3 node and the PE5 node are devices that support SSCs. Therefore, the present Embodiment 14 is also a scenario of mutual communication between a device supporting the SSC and a traditional SPN device.

Figure 33:
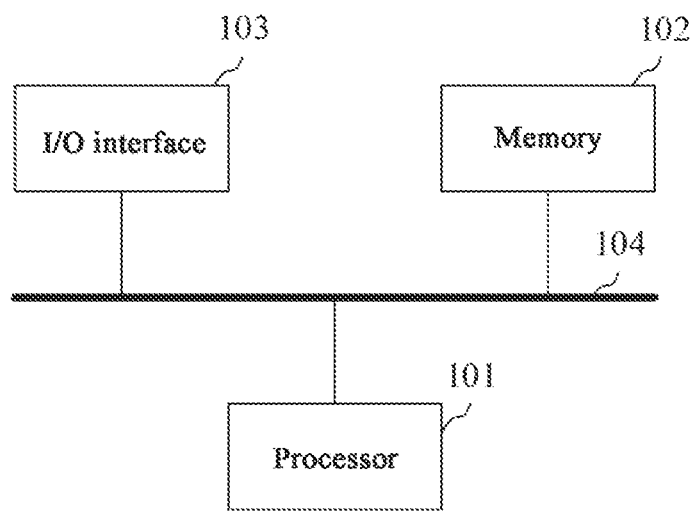
FIG. 33 is a composition block diagram of a provider edge device provided in an embodiment of the present disclosure.

According to a fourth aspect, referring to FIG. 33, an embodiment of the present disclosure provides a provider edge device PE, including: one or more processors 101; a storage apparatus 102, on which one or more programs are stored, wherein when the one or more programs are executed by the one or more processors, the one or more processors implement any one of the foregoing service data processing methods, or any one of the foregoing service data extraction methods; and one or more I/O interfaces 103, which are connected between the processor and the memory and are configured to implement information interaction between the processor and the memory.

The processor 101 is a device with data processing capability, which includes, but is not limited to, a central processing unit (CPU) and the like. The memory 102 is a device with data storage capability, which includes, but is not limited to, a random access memory (RAM, more specifically such as SDRAM and DDR), a read-only memory (ROM), an electrically erasable programmable read-only memory (EEPROM), and a flash memory (FLASH). The I/O interface (read/write interface) 103 is connected between the processor 101 and the memory 102, and may implement information interaction between the processor 101 and the memory 102, and the I/O interface includes, but is not limited to, a data bus.

In some embodiments, the processor 101, the memory 102 and the I/O interface 103 are connected to each other by means of a bus 104, and then are connected to other components of a computing device.

It should be noted that, when the PE device sends data, the PE device serves as a source PE node. When the PE device receives data, the PE device serves as a host PE node.

The service data processing method and the service data extraction method have been described in detail above, and thus details are not described herein again.

Figure 34:
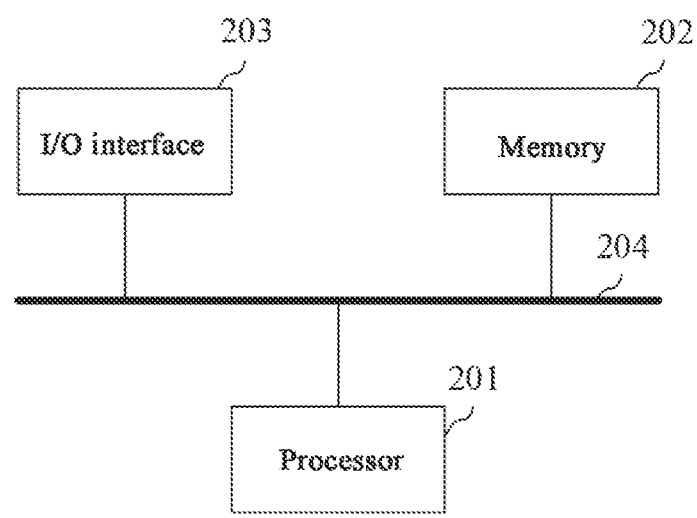
FIG. 34 is a composition block diagram of a provider exchange device provided in an embodiment of the present disclosure.

According to a fifth aspect, referring to FIG. 34, an embodiment of the present disclosure provides a provider exchange device, including: one or more processors 201; a storage apparatus 202, on which one or more programs are stored, wherein when the one or more programs are executed by the one or more processors, the one or more processors implement any one of the foregoing service data exchange methods; and one or more I/O interfaces 203, which are connected between the processor and the memory and are configured to implement information interaction between the processor and the memory.

The processor 201 is a device with data processing capability, which includes, but is not limited to, a central processing unit (CPU) and the like. The memory 202 is a device with data storage capability, which includes, but is not limited to, a random access memory (RAM, more specifically such as SDRAM and DDR), a read-only memory (ROM), an electrically erasable programmable read-only memory (EEPROM), and a flash memory (FLASH). The I/O interface (read/write interface) 203 is connected between the processor 201 and the memory 202, and may implement information interaction between the processor 201 and the memory 202, and the I/O interface includes, but is not limited to, a data bus (Bus).

In some embodiments, the processor 201, the memory 202 and the I/O interface 203 are connected to each other by means of a bus 204, and then are connected to other components of a computing device.

The service data exchange method has been described in detail above, and thus details are not described herein again.

Figure 35:
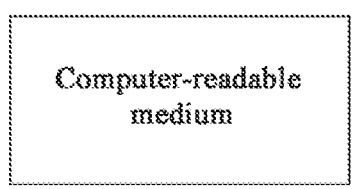
FIG. 35 is a composition block diagram of a computer-readable medium provided in an embodiment of the present disclosure.

According to a sixth aspect, referring to FIG. 35, an embodiment of the present disclosure provides a computer-readable medium, on which a computer program is stored, wherein when executed by a processor, the program implements any one of the foregoing service data processing methods, or any one of the foregoing service data exchange methods, or any one of the foregoing service data extraction methods. The computer-readable medium includes, but is not limited to, a random access memory (RAM, more specifically such as SDRAM and DDR), a read-only memory (ROM), an electrically erasable programmable read-only memory (EEPROM), and a flash memory (FLASH).

The service data processing method, the service data extraction method and the service data exchange method have been described in detail above, and thus details are not described herein again.

Those ordinary skilled in the art can understand that, functional units/units in all or some of steps in the methods, systems or apparatuses described above may be implemented as software, firmware, hardware and appropriate combinations thereof. In a hardware implementation manner, the division between the functional modules/units mentioned in the above description does not necessarily correspond to the division of physical components, for example, one physical component may have a plurality of functions, or one function or step may be executed cooperatively by several physical components. Some or all physical components may be implemented as software, which is executed by a processor, such as a central processing unit, a digital signal processor or a microprocessor, or implemented as hardware, or implemented as an integrated circuit, such as an application-specific integrated circuit. Such software may be distributed on a computer-readable medium, wherein the computer-readable medium may include a computer storage medium (or a non-transitory medium) and a communication medium (or a transitory medium). As is well known to those ordinary skilled in the art, the term computer storage medium includes volatile and nonvolatile, and removable and non-removable media, which are implemented in any method or technology for storing information (such as computer readable instructions, data structures, program modules or other data). The computer storage medium includes, but is not limited to, an RAM, an ROM, an EEPROM, a flash memory or other memory technologies, a CD-ROM, a digital versatile disk (DVD) or other optical disk memories, a magnetic cassette, a magnetic tape, a magnetic disk storage or other magnetic storage apparatuses, or any other media, which may be used for storing desired information and which may be accessed by a computer. In addition, it is well known to those ordinary skilled in the art that, the communication medium typically contains computer readable instructions, data structures, program modules or other data in modulated data signals such as carrier waves or other transport mechanism, and may include any information transmission media.

Example embodiments have been disclosed herein. Although specific terms are employed, they are used only and should be construed in a generic and descriptive sense only and not for the purposes of limitation. In some instances, it will be apparent to those skilled in the art that, unless expressly stated otherwise, features, characteristics, and/or elements, which are described in combination with specific embodiments, may be used alone, or may be used with features, characteristics, and/or elements, which are described in combination with other embodiments. Therefore, it will be understood by those skilled in the art that, various changes in form and detail may be made without departing from the scope of the present disclosure as set forth in the appended claims.

We claim:
1. A service data processing method, comprising:
   generating, based on service data of a plurality of client services, service blocks of the client services, respectively;
   mapping the service blocks of the client services into a payload area of at least one sub slicing frame (SSF); and
   configuring an overhead area field of each SSF to obtain the at least one SSF, wherein each of the SSF carries the service blocks of a plurality of different client services,
   wherein the SSF comprises a start block, at least one data block and a terminate block, and a frame length of the SSF is fixed; and
   the service data processing method further comprises:
      carrying a payload of the SSF in at least one of the data block or the terminate block; and
   carrying an overhead of the SSF in at least one of the start block, the data block or the terminate block.

2. The service data processing method according to claim 1, wherein mapping the service blocks of the client services into the payload area of the at least one sub slicing frame (SSF) comprises:
   dividing the payload area of the at least one SSF into a plurality of slots; and
   mapping the service blocks of the client services into different slots among the plurality of slots, respectively, wherein the slots corresponding to the different client services constitute sub slicing channels (SSCs) carrying the client services respectively.

3. The service data processing method according to claim 2, wherein mapping the service blocks of the client services into the payload area of the at least one sub slicing frame (SSF) comprises mapping the service blocks of the client services into payload areas of a plurality of SSFs; and
   dividing the payload area of the at least one SSF into the plurality of slots comprises:
      dividing a payload area of a sub slicing multi-frame (SSMF) into the plurality of slots, the SSMF comprising the plurality of SSFs.

4. The service data processing method according to claim 2, wherein mapping the service blocks of the client services into the different slots among the plurality of slots, respectively comprises:
   determining, based on granularities of different client services, positions and numbers of slots for carrying the different client services, respectively, among the plurality of slots; and
   mapping, based on the positions and numbers of the slots for carrying the different client services, respectively, the service blocks of the different client services into corresponding slots.

5. The service data processing method according to claim 2, wherein configuring the overhead area field of each SSF to obtain the at least one SSF comprises:
   configuring, in an overhead area of the at least one SSF, a correspondence between the client services and the slots for carrying the client services, respectively; and
   configuring other overhead fields of the at least one SSF to obtain the at least one SSF;

wherein configuring, in the overhead area of the at least one SSF, the correspondence between the client services and the slots for carrying the client services, respectively comprises:
configuring, in a slot identifier field of the overhead area, slot information for carrying the client services; and
configuring, in a channel identifier field of the overhead area, SSC information for carrying the client services.

6. The service data processing method according to claim 5, wherein dividing the payload area of the at least one SSF into the plurality of slots comprises dividing the payload areas of a plurality of SSFs into a plurality of slots; and
configuring, in the overhead area of the at least one SSF, the correspondence between the client services and the slots for respectively carrying the client services further comprises:
configuring, in a multi-frame indication field of the overhead area, position information of the SSF in an SSMF composed of a plurality of SSFs.

7. The service data processing method according to claim 5, wherein the other overhead fields of the SSF comprise:
a frame type field, for indicating a structure of the SSF;
a fault indication field, for indicating a fault condition of a service layer channel;
a service type field, for identifying a type of the client service; and
a check field, for storing check information.

8. The service data processing method according to claim 1, wherein after the generating, based on service data of the plurality of client services, service blocks of the client services, the service data processing method further comprises at least one of:
inserting an operation administration and maintenance (OAM) block into a service block code stream composed of service blocks of the same client service; or
inserting a service idle block into a service block code stream composed of service blocks of the same client service.

9. The service data processing method according to claim 1, wherein after configuring the overhead area field of each SSF to obtain the at least one sub slicing frame (SSF), the service data processing method further comprises:
inserting an inter-frame idle block between adjacent SSFs based on a rate of the SSF and a port rate of service layer.

10. The service data processing method according to claim 1, wherein the SSF is composed of 64/66B blocks conforming to IEEE 802.3 encoding specification.

11. The service data processing method according to claim 10, wherein:
the client services comprise an Ethernet service; and
generating, based on service data of the plurality of client services, service blocks of the client services comprises at least one of:
taking 64/66B Ethernet service blocks of the client services that conform to the IEEE 802.3 encoding specification as the service blocks; or
performing compression transcoding on the 64/66B Ethernet service blocks of the client services that conform to the IEEE 802.3 encoding specification to generate the service blocks.

12. The service data processing method according to claim 11, wherein performing compression transcoding on the 64/66B Ethernet service blocks of the client services that conform to the IEEE 802.3 encoding specification to generate the service blocks comprises at least one of:
performing compression transcoding, by using 256/257B encoding, on the 64/66B Ethernet service blocks to generate 256/257B blocks that conform to the IEEE 802.3 standard; or
performing compression transcoding, by using 65B encoding, on the 64/66B Ethernet service blocks to generate 65B blocks, wherein performing compression transcoding, by using 65B encoding, on the 64/66B Ethernet service blocks to generate the 65B blocks comprises:
deleting, based on a predetermined rule, one bit from a sync header of the 64/66B Ethernet service block to obtain the 65B block, wherein the predetermined rule comprises deleting a first bit from the sync header, or deleting a second bit from the sync header.

13. The service data processing method according to claim 10, wherein:
the client services comprise a time division multiplexing (TDM) service;
generating, based on service data of the plurality of client services, service blocks of the client services comprises: mapping, based on a circuit emulation services over Ethernet (CESOETH), a service code stream of the TDM service into an Ethernet service code stream to generate an Ethernet service block; and/or
generating, based on service data of the plurality of client services, service blocks of the client services comprises: encoding a service code stream of the TDM service to generate a 64/66B block that conforms to the IEEE 802.3 encoding specification.

14. The service data processing method according to claim 1, wherein the service data processing method further comprises:
performing service layer processing on the SSF to transmit the SSF through the service layer.

15. A service data exchange method, comprising:
determining outgoing ports of service blocks in incoming sub slicing frames (SSFs) received via incoming ports, wherein each of the incoming SSFs carries the service blocks of a plurality of different client services;
mapping the service blocks corresponding to a same outgoing port into at least one outgoing SSF, wherein each of the outgoing SSFs carries the service blocks of a plurality of different client services; and
transmitting the outgoing SSFs through the outgoing ports,
wherein the SSF comprises a start block, at least one data block and a terminate block, and a frame length of the SSF is fixed; and
wherein a payload of the SSF is carried in at least one of the data block or the terminate block; and an overhead of the SSF is carried in at least one of the start block, the data block or the terminate block.

16. The service data exchange method according to claim 15, wherein:
determining the outgoing ports of the service blocks in the incoming SSFs received via the incoming ports comprises: determining outgoing ports of service blocks in different incoming slots received via the incoming ports, wherein the incoming slot is a slot in at least one incoming SSF; and
mapping the service blocks corresponding to the same outgoing port into at least one outgoing SSF comprises: mapping service blocks in different incoming slots into different outgoing slots, respectively, the service blocks corresponding to the same outgoing port, wherein the outgoing slot is a slot in at least one outgoing SSF; and determining the outgoing ports of the service blocks in the different incoming slots received via the incoming ports comprises: determining, based on a slot crossover configuration table, the outgoing ports of the service blocks in the different incoming slots received via the incoming ports, wherein a correspondence between the incoming slots and the outgoing slots is stored in the slot crossover configuration table.

17. The service data exchange method according to claim 16, wherein the service data exchange method further comprises at least one of:
performing, based on a local system clock and a rate of the outgoing slot, addition/deletion processing on a service idle block in a service block code stream composed of the service blocks in the same outgoing slot,
performing, based on the local system clock and a rate of the incoming slot, addition/deletion processing on a service idle block in a service block code stream composed of the service blocks in the same incoming slot;
performing, based on a local system clock and a rate of the outgoing slot, addition/deletion processing on an inter-frame idle block between the outgoing SSFs in the same outgoing port, or,
performing, based on the local system clock and a rate of the incoming slot, addition/deletion processing on an inter-frame idle block between the incoming SSFs in the same incoming port.

18. A service data extraction method, comprising:
extracting a service block of a predetermined client service from at least one sub slicing frame (SSF), wherein each of the SSF carries service blocks of a plurality of different client services; and
decoding the service block of the predetermined client service to extract service data of the predetermined client service,
wherein the SSF comprises a start block, at least one data block and a terminate block, and a frame length of the SSF is fixed; and
wherein a payload of the SSF is carried in at least one of the data block or the terminate block; and an overhead of the SSF is carried in at least one of the start block, the data block or the terminate block.

19. A non-statutory computer-readable medium, stored a computer program thereon, wherein when executed by a processor, the program implements the service data processing method according to claim 1.

20. A non-statutory computer-readable medium, stored a computer program thereon, wherein when executed by a processor, the program implements the service data exchange method according to claim 15.

21. A non-statutory computer-readable medium, stored a computer program thereon, wherein when executed by a processor, the program implements the service data extraction method according to claim 18.

* * * * *